United States Patent [19]

Etzbach et al.

[11] Patent Number: 5,785,719
[45] Date of Patent: Jul. 28, 1998

[54] METHINE AND AZO DYE-CONTAINING DYE MIXTURES

[75] Inventors: Karl-Heinz Etzbach, Frankenthal; Rüdiger Sens, Mannheim, both of Germany

[73] Assignee: BASF Aktiengesellschaft, Ludwigshafen, Germany

[21] Appl. No.: 793,341

[22] PCT Filed: Oct. 6, 1995

[86] PCT No.: PCT/EP95/03947

§ 371 Date: Apr. 18, 1997

§ 102(e) Date: Apr. 18, 1997

[87] PCT Pub. No.: WO96/11987

PCT Pub. Date: Apr. 25, 1996

[30] Foreign Application Priority Data

Oct. 18, 1994 [DE] Germany .................. 44 37 166.7

[51] Int. Cl.$^6$ .................. C09B 67/22; B41M 5/38
[52] U.S. Cl. .................. 8/471; 8/506; 8/639
[58] Field of Search .................. 8/471, 506, 638, 8/639

[56] References Cited

U.S. PATENT DOCUMENTS

| | | |
|---|---|---|
| 5,079,365 | 1/1992 | Sens et al. . |
| 5,132,438 | 7/1992 | Bach et al. . |
| 5,147,845 | 9/1992 | Sens et al. ............ 503/227 |
| 5,283,326 | 2/1994 | Hansen et al. . |
| 5,376,150 | 12/1994 | Lange et al. ............ 8/638 |
| 5,545,235 | 8/1996 | Sen et al. . |

FOREIGN PATENT DOCUMENTS

| | | |
|---|---|---|
| 0532 008 | 3/1993 | European Pat. Off. . |
| 0 399 473 B1 | 9/1993 | European Pat. Off. . |
| 0 569 785 | 11/1993 | European Pat. Off. . |
| 0 591 736 | 4/1994 | European Pat. Off. . |
| 95/00564 | 1/1995 | WIPO . |

*Primary Examiner*—Margaret Einsmann
*Attorney, Agent, or Firm*—Oblon, Spivak, McClelland, Maier & Neustadt, P.C.

[57] ABSTRACT

Dye mixtures include one or more pyridone dyes of the formula

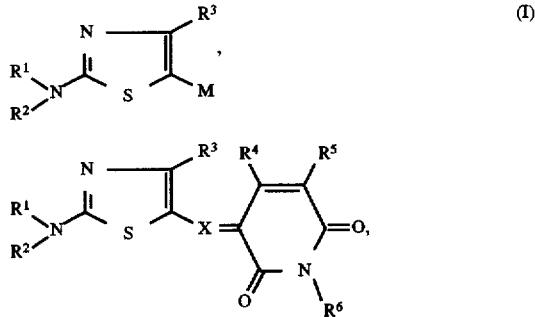

where M is a pyridone or triazolopyridone radical which is linked to the thiazole ring via nitrogen or CH and the rest of the radicals are each as defined in the description, and one or more azo dyes of the formula

D—N=N—K, where D is the radical of a diazo component of the pyrrole, thiophene, pyrazole, thiazole, isothiazole, triazole, thiadiazole, benzothiophene, benzothiazole, benzisothiazole, pyridothiophene, pyrimidothiophene, thienothiophene or aniline series, and K is the radical of a coupling component of the aminothiazole, aniline or tetrahydroquinoline series, and are useful for thermal transfer.

12 Claims, No Drawings

METHINE AND AZO DYE-CONTAINING DYE MIXTURES

The present invention relates to novel dye mixtures including one or more pyridone dyes of the formula I $$\begin{array}{c} R^1 \\ \diagdown \\ R^2 \end{array} N - C \begin{array}{c} N - R^3 \\ \diagup \\ S \end{array} M \qquad (I)$$

where

- $R^1$ and $R^2$ are independently of each other $C_1$–$C_{10}$-alkyl with or without substitution by $C_1$–$C_4$-alkoxycarbonyl, $C_1$–$C_4$-alkoxycarbonyloxy, whose alkyl chain may in each case be interrupted by an oxygen atom in ether function, or phenyl and with or without interruption by from 1 to 4 oxygen atoms in ether function, $C_5$–$C_7$-cycloalkyl, $C_3$–$C_4$-alkenyl, unsubstituted or $C_1$–$C_4$-alkyl-, $C_1$–$C_4$-alkoxy-, halogen- or nitro-substituted phenyl, or $R^1$ and $R^2$ are together with the nitrogen atom joining them together a 5- or 6-membered saturated heterocyclic radical with or without further hetero atoms,
- $R^3$ is $C_3$–$C_{10}$-alkyl, unsubstituted or $C_1$–$C_4$-alkyl-, $C_1$–$C_4$-alkoxy-, halogen- or nitro-substituted phenyl or thienyl, $C_5$–$C_7$-cycloalkyl, and
- M is a radical of the formula $$-X=\begin{array}{c} R^4 \\ \diagdown \\ \diagup \end{array}\begin{array}{c} R^5 \\ \diagdown \\ O, \end{array} \quad -X=\begin{array}{c} R^4 \\ \diagdown \\ \diagup \end{array}\begin{array}{c} R^5 \\ \diagdown \\ N \end{array} \text{ or}$$

$$\begin{array}{c} R^5 \\ \diagdown \\ O \end{array}\begin{array}{c} R^4 \\ \diagdown \\ N \end{array}\begin{array}{c} X - \\ \diagup \\ N \end{array},$$

where

X is nitrogen or CH, $R^4$ is hydrogen, $C_1$–$C_6$-alkyl or unsubstituted or $C_1$–$C_4$-alkyl-, $C_1$–$C_4$-alkoxy-, halogen- or nitro-substituted phenyl, $R^5$ is cyano, carbamoyl, mono- or di($C_1$–$C_8$-alkyl)carbamoyl, carboxyl, $C_1$–$C_8$-alkoxycarbonyl or benzimidazolyl, $R^6$ is hydrogen, $C_1$–$C_{10}$-alkyl with or without substitution by phenyl, phenoxy, cyclohexyloxy or pyrazolyl and with or without interruption by from 1 to 4 oxygen atoms in ether function, $C_5$–$C_7$-cycloalkyl or unsubstituted or $C_1$–$C_4$-alkyl-, $C_1$–$C_4$-alkoxy-, halogen- or nitro-substituted phenyl, or a radical of the formula $NB^1B^2$ where $B^1$ and $B^2$ are independently of each other hydrogen, $C_1$–$C_{10}$-alkyl, unsubstituted or $C_1$–$C_4$-alkyl-, $C_1$–$C_4$-alkoxy-, halogen- or nitro-substituted phenyl, $C_1$–$C_9$-alkanoyl, $C_1$–$C_8$-alkylsulfonyl, unsubstituted or $C_1$–$C_4$-alkyl-, $C_1$–$C_4$-alkoxy-, halogen- or nitro-substituted phenylsulfonyl, pyridylsulfonyl, unsubstituted or $C_1$–$C_4$-alkyl-, $C_1$–$C_4$-alkoxy-, halogen- or nitro-substituted benzoyl, pyridylcarbonyl or thienylcarbonyl, and one of the two radicals A and E is nitrogen and the other is a radical of the formula C—$R^7$, where $R^7$ has the meaning of $C_{10}$-alkyl, with or without phenyl, phenoxy, cyclohexyloxy or pyrazolyl substitution and with or without interruption by from 1 to 4 oxygen atoms in ether function, of $C_5$–$C_7$-cycloalkyl or of unsubstituted or $C_1$–$C_4$-alkyl-, $C_1$–$C_4$-alkoxy-, halogen- or nitro-substituted phenyl, and one or more azo dyes of the formula II $$D-N=N-K \qquad (II),$$

where

D is a radical of the formula $$\begin{array}{c} L^2 \diagdown \diagup L^3 \\ L^1 \diagup N \diagdown \\ | \\ L^4 \end{array} \qquad (IIIa)$$

$$\begin{array}{c} L^2 \diagdown \diagup L^3 \\ L^1 \diagup S \diagdown \end{array} \qquad (IIIb)$$

$$\begin{array}{c} L^5 \diagdown \diagup L^6 \\ N \diagdown N \diagup \\ | \\ L^4 \end{array} \qquad (IIIc)$$

$$\begin{array}{c} L^8 \diagdown \diagup N \\ L^7 \diagup S \diagdown \end{array} \qquad (IIId)$$

$$\begin{array}{c} L^9 \diagdown \diagup L^6 \\ N \diagdown S \diagup \end{array} \qquad (IIIe)$$

$$\begin{array}{c} L^{10} \diagdown \diagup N \\ N \diagdown N \diagup \\ | \\ L^4 \end{array} \qquad (IIIf)$$

$$\begin{array}{c} N \text{——} N \\ L^{11} \diagup S \diagdown \end{array} \qquad (IIIg)$$

$$\begin{array}{c} L^{12} \diagdown \diagup N \\ N \diagdown S \diagup \end{array} \qquad (IIIh)$$

$$L^{13} - \bigcirc \begin{array}{c} CN \\ \diagup \\ S \diagdown \end{array} \qquad (IIIi)$$

$$L^{13} - \bigcirc \begin{array}{c} \diagup \\ S \diagdown \\ CN \end{array} \qquad (IIIj)$$

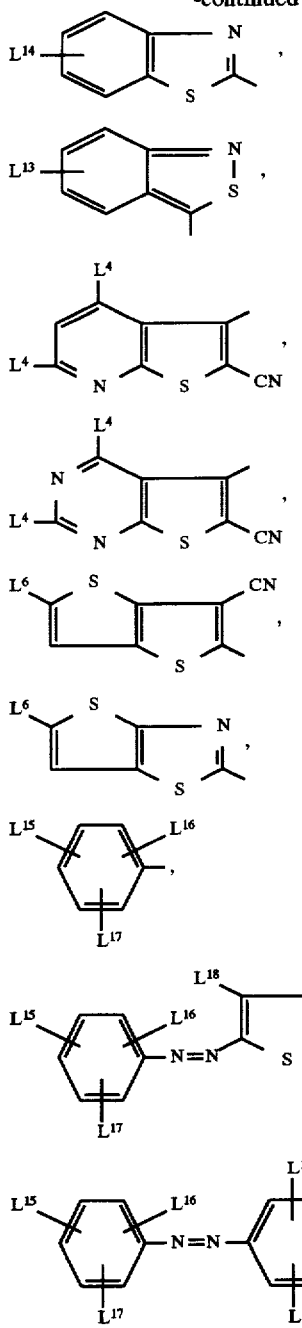

where $L^1$ is nitro, cyano, $C_1$–$C_6$-alkanoyl, benzoyl, $C_1$–$C_8$-alkoxycarbonyl, $C_1$–$C_8$-alkylsulfonyl, unsubstituted or $C_1$–$C_4$-alkyl-, $C_1$–$C_4$-alkoxy-, halogen- or nitro-substituted phenylsulfonyl or a radical of the formula —CH=T, where T is hydroxyimino, $C_1$–$C_4$-alkoxyimino or a radical of an acidic-CH compound $H_2T$, $L^2$ is hydrogen, $C_1$–$C_6$-alkyl, unsubstituted or $C_1$–$C_4$-alkyl-, $C_1$–$C_4$-alkoxy-, halogen- or nitro-substituted phenyl, halogen, hydroxyl, mercapto, unsubstituted or phenyl- or $C_1$–$C_4$-alkoxy-substituted $C_1$–$C_6$-alkoxy, unsubstituted or $C_1$–$C_4$-alkyl-, $C_1$–$C_4$-alkoxy-, halogen- or nitro-substituted phenoxy, unsubstituted or phenyl-substituted $C_1$–$C_8$-alkylthio, unsubstituted or $C_1$–$C_4$-alkyl-, $C_1$–$C_4$-alkoxy-, halogen- or nitro-substituted phenylthio, $C_1$–$C_8$-alkylsulfonyl or unsubstituted or $C_1$–$C_4$-alkyl-, $C_1$–$C_4$-alkoxy-, halogen- or nitro-substituted phenylsulfonyl, $L^3$ is cyano, $C_1$–$C_8$-alkoxycarbonyl or nitro.

$L^4$ is hydrogen, $C_1$–$C_6$-alkyl, phenyl or tolyl, $L^5$ is $C_1$–$C_6$-alkyl, phenyl or tolyl, $L^6$ is hydrogen, cyano, $C_1$–$C_8$-alkoxycarbonyl, $C_1$–$C_6$-alkanoyl, thiocyanato, halogen or nitro, $L^7$ is nitro, cyano, $C_1$–$C_6$-alkanoyl, benzoyl, $C_1$–$C_8$-alkoxycarbonyl, $C_1$–$C_8$-alkylsulfonyl, unsubstituted or $C_1$–$C_4$-alkyl-, $C_1$–$C_4$-alkoxy-, halogen- or nitro-substituted phenylsulfonyl or a radical of the formula —CH=T, where T is as defined above, $L^8$ is hydrogen, $C_1$–$C_6$-alkyl, unsubstituted or $C_1$–$C_4$-alkyl-, $C_1$–$C_4$-alkoxy-, halogen- or nitro-substituted phenyl, cyano, halogen, unsubstituted or phenyl- or $C_1$–$C_4$-alkoxy-substituted $C_1$–$C_6$-alkoxy, unsubstituted or phenyl-substituted $C_1$–$C_8$-alkylthio, unsubstituted or $C_1$–$C_4$-alkyl-, $C_1$–$C_4$-alkoxy-, halogen- or nitro-substituted phenylthio, $C_1$–$C_8$-alkylsulfonyl, unsubstituted or $C_1$–$C_4$-alkyl-, $C_1$–$C_4$-alkoxy-, halogen- or nitro-substituted phenylsulfonyl or $C_1$–$C_8$-alkoxycarbonyl, $L^9$ is cyano, unsubstituted or phenyl-substituted $C_1$–$C_6$-alkyl, unsubstituted or phenyl-substituted $C_1$–$C_8$-alkoxy, unsubstituted or phenyl-substituted $C_1$–$C_8$-alkylthio, unsubstituted or $C_1$–$C_4$-alkyl-, $C_1$–$C_4$-alkoxy-, halogen- or nitro-substituted phenyl, thienyl, $C_1$–$C_4$-alkylthienyl, pyridyl or $C_1$–$C_4$-alkylpyridyl, $L^{10}$ is phenyl, tolyl or pyridyl, $L^{11}$ is trifluoromethyl, nitro, $C_1$–$C_6$-alkyl, phenyl, unsubstituted or phenyl-substituted $C_1$–$C_8$-alkylthio or $C_1$–$C_6$-dialkylamino, $L^{12}$ is $C_1$–$C_6$-alkyl, phenyl, unsubstituted or phenyl-substituted $C_1$–$C_8$-alkylthio, 2-cyanoethylthio or 2-($C_1$–$C_6$-alkoxycarbonyl)ethylthio, $L^{13}$ is hydrogen, nitro or halogen, $L^{14}$ is hydrogen, cyano, $C_1$–$C_8$-alkoxycarbonyl, nitro or halogen, $L^{15}$, $L^{16}$ and $L^{17}$ are independently of one another hydrogen, $C_1$–$C_6$-alkyl, $C_1$–$C_6$-alkoxy, halogen, nitro, cyano, unsubstituted or phenoxy-substituted $C_1$–$C_8$-alkoxycarbonyl, $C_1$–$C_8$-alkylsulfonyl or unsubstituted or $C_1$–$C_4$-alkyl-, $C_1$–$C_4$-alkoxy-, halogen- or nitro-substituted phenylsulfonyl, or $L^{15}$ and $L^{16}$ are together a radical of the formula CO—NW—CO, where W is $C_1$–$C_{10}$-alkyl with or without interruption by from 1 to 4 oxygen atoms in ether function and with or without substitution by hydroxyl, $L^{18}$ is hydrogen, methyl or chlorine, and $L^{19}$ is cyano or $C_1$–$C_8$-alkoxycarbonyl, and K is a radical of the formula

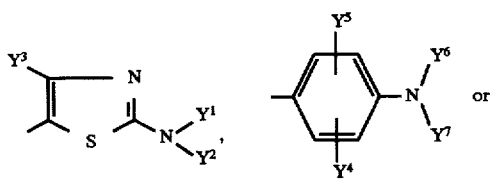

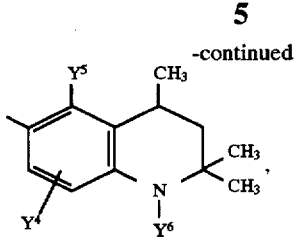

where

Y$^1$ and Y$^2$ are independently of each other C$_1$–C$_{10}$-alkyl with or without substitution by cyano, hydroxyl, halogen, C$_1$–C$_4$-alkanoyloxy, C$_1$–C$_4$-alkoxycarbonyl, C$_1$–C$_4$-alkoxycarbonyloxy, whose alkyl chain may in each case be interrupted by an oxygen atom in ether function, or phenyl and with or without interruption by from 1 to 4 oxygen atoms in ether function, C$_5$–C$_7$-cycloalkyl, C$_3$–C$_4$-alkenyl, unsubstituted or C$_1$–C$_4$-alkyl-, C$_1$–C$_4$-alkoxy-, halogen- or nitro-substituted phenyl, or Y$^1$ and Y$^2$ are together with the nitrogen atom joining them together a 5- or 6-membered saturated heterocyclic radical with or without further hetero atoms, Y$^3$ is C$_3$–C$_{10}$-alkyl, C$_5$–C$_7$-cycloalkyl, unsubstituted or C$_1$–C$_4$-alkyl-, C$_1$–C$_4$-alkoxy-, halogen- or nitro-substituted phenyl or thienyl, Y$^4$ is hydrogen, C$_1$–C$_{10}$-alkyl with or without interruption by from 1 to 4 oxygen atoms in ether function, hydroxyl, C$_1$–C$_6$-alkoxy, in particular methoxy or ethoxy, C$_1$–C$_4$-alkylsulfonamido, mono- or di(C$_1$–C$_8$-alkyl)aminosulfonylamino or the radical —NHCOY$^8$ or —NHCO$_2$Y$^8$, where Y$^8$ is phenyl, benzyl, tolyl or C$_1$–C$_{10}$-alkyl with or without interruption by from 1 to 4 oxygen atoms in ether function, Y$^5$ is hydrogen, C$_1$–C$_6$-alkyl or C$_1$–C$_6$-alkoxy, and Y$^6$ and Y$^7$ are independently of each other hydrogen, C$_1$–C$_{10}$-alkyl, with or without substitution by cyano, hydroxyl, halogen, C$_1$–C$_4$-alkanoyloxy, C$_1$–C$_4$-alkoxycarbonyl, C$_1$–C$_4$-alkoxycarbonyloxy, whose alkyl chain may in each case be interrupted by an oxygen atom in ether function, or phenyl and with or without interruption by from 1 to 4 oxygen atoms in ether function, C$_5$–C$_7$-cycloalkyl, C$_3$–C$_4$-alkenyl, unsubstituted or C$_1$–C$_4$-alkyl-, C$_1$–C$_4$-alkoxy-, halogen- or nitro-substituted phenyl, or Y$^6$ and Y$^7$ are together with the nitrogen atom joining them together a 5- or 6-membered saturated heterocyclic radical with or without further hetero atoms, and to a process for the thermal transfer of these dyes.

In the thermal transfer printing process, a transfer sheet which contains a thermally transferable dye in one or more binders with or without suitable auxiliaries on a support material is heated from the back with an energy source, for example with a thermal head or a laser, for short periods (duration: fractions of a second), causing the dye to migrate out of the transfer sheet and diffuse into the surface coating of a receiving medium. The essential advantage of this process is that the amount of dye to be transferred (and thus the color gradation) is easy to control by controlling the energy to be emitted by the energy source.

Generally, color recording is carried out using the three subtractive primaries of yellow, magenta and cyan (with or without black).

It is known to carry out the thermal transfer printing process with individual dyes or else with mixtures of dyes. However, it has been found that the dyes used frequently still have applications defects.

It is an object of the present invention to provide novel dye mixtures in the blue and red region which shall be advantageous for thermal transfer.

We have found that this object is achieved by the above-defined dye mixtures.

Any alkyl and alkenyl appearing in the abovementioned formulae may be straight-chain or branched.

In any substituted alkyl appearing in the abovementioned formulae the number of substituents is generally 1 or 2.

In any substituted phenyl, pyridyl or thienyl appearing in the abovementioned formulae the number of substituents is generally from 1 to 3, preferably 1 or 2.

B$^1$, B$^2$, L$^2$, L$^4$, L$^5$, L$^8$, L$^9$, L$^{11}$, L$^{12}$, L$^{15}$, L$^{16}$, L$^{17}$, R$^1$, R$^2$, R$^4$, R$^6$, R$^7$, Y$^1$, Y$^2$, Y$^4$, Y$^5$, Y$^6$, Y$^7$, Y$^8$ and W are each for example methyl or ethyl.

R$^3$ and Y$^3$ as well as B$^1$, B$^2$, L$^2$, L$^4$, L$^5$, L$^8$, L$^9$, L$^{11}$, L$^{12}$, L$^{15}$, L$^{16}$, L$^{17}$, R$^1$, R$^2$, R$^4$, R$^6$, R$^7$, Y$^1$, Y$^2$, Y$^4$, Y$^5$, Y$^6$, Y$^7$, Y$^8$ and W are each propyl, isopropyl, butyl, isobutyl, sec-butyl, tert-butyl, pentyl, isopentyl, neopentyl, tert-pentyl, hexyl or 2-methylpentyl.

B$^1$, B$^2$, R$^1$, R$^2$, R$^3$, R$^6$, R$^7$, Y$^1$, Y$^2$, Y$^3$, Y$^4$, Y$^6$, Y$^7$, Y$^8$ and W may each also be for example heptyl, octyl, 2-ethylhexyl, isooctyl, nonyl, isononyl, decyl or isodecyl (the designations isooctyl, isononyl and isodecyl are trivial names derived from the oxo process alcohols—cf. Ullmann's Encyclopedia of Industrial Chemistry, 5$^{th}$ Edition, Vol. A 1, pages 290 to 293, and Vol. A 10, pages 284 and 285).

R$^1$, R$^2$, R$^3$, R$^6$, R$^7$, Y$^1$, Y$^2$, Y$^3$, Y$^6$ and Y$^7$ may each also be for example cyclopentyl, methylcyclopentyl, dimethylcyclopentyl, cyclohexyl, methylcyclohexyl or cycloheptyl.

R$^1$, R$^2$, R$^6$, R$^7$, Y$^1$, Y$^2$, Y$^4$, Y$^6$, Y$^7$, Y$^8$ and W may each also be for example 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,8-trioxadecyl, 3,6,9-trioxyundecyl, 3,6,9,12-tetraoxatridecyl or 3,6,9,12-tetraoxatetradecyl.

R$^1$, R$^2$, Y$^1$, Y$^2$, Y$^6$ and Y$^7$ may each also be for example 2-methoxycarbonylethyl, 2-ethoxycarbonylethyl, 2-propoxycarbonylethyl, 2-isopropoxycarbonylethyl, 2-butoxycarbonylethyl, 2- or 3-methoxycarbonylpropyl, 2- or 3-ethoxycarbonylpropyl, 2- or 3-propoxycarbonylpropyl, 2- or 3-butoxycarbonylpropyl, 2- or 4-methoxycarbonylbutyl, 2- or 4-ethoxycarbonylbutyl, 2- or 4-propoxycarbonylbutyl, 2- or 4-butoxycarbonylbutyl, 2-methoxycarbonyloxyethyl, 2-ethoxycarbonyloxyethyl, 2-propoxycarbonyloxyethyl, 2-isopropoxycarbonyloxyethyl, 2-butoxycarbonyloxyethyl, 2- or 3-methoxycarbonyloxypropyl, 2- or 3-ethoxycarbonyloxypropyl, 2- or 3-propoxycarbonyloxypropyl, 2- or 3-butoxycarbonyloxypropyl, 2- or 4-methoxycarbonyloxybutyl, 2- or 4-ethoxycarbonyloxybutyl, 2- or 4-propoxycarbonyloxybutyl, 2- or 4-butoxycarbonyloxybutyl, prop-1-en-3-yl, but-2-en-4-yl or 2-methylprop-1-en-3-yl.

R$^6$ and R$^7$ may also be for example 2-benzyloxyethyl, 2-pyrazol-1-yl-ethyl, 2- or 3-benzyloxypropyl, 2- or 3-pyrazol-1-ylpropyl, 2- or 4-benzyloxybutyl, 2- or 4-pyrazol-1-ylbutyl, 2-phenoxyethyl, 2- or 3-phenoxypropyl, 2- or 4-phenoxybutyl, 2-cyclohexyloxyethyl, 2- or 3-cyclohexyloxypropyl, or 2- or 4-cyclohexyloxybutyl.

$Y^1$, $Y^2$, $Y^6$ and $Y^7$ may each also be for example 2-cyanoethyl, 2- or 3-cyanopropyl, 2- or 4-cyanobutyl, 2-hydroxyethyl, 2- or 3-hydroxypropyl, 2- or 4-hydroxybutyl, 2-chloroethyl, 2- or 3-chloropropyl, 2- or 4-chlorobutyl, 2-acetyloxyethyl, 2- or 3-acetyloxypropyl, 2- or 4-acetyloxybutyl, 2-propionyloxyethyl, 2- or 3-propionyloxypropyl or 2- or 4-propionyloxybutyl.

$L^9$, $R^1$, $R^2$, $R^6$, $R^7$, $Y^1$, $Y^2$, $Y^6$ and $Y^7$ may each also be for example benzyl or 1- or 2-phenylethyl.

$B^1$, $B^2$, $L^2$, $L^8$, $L^9$, $R^1$, $R^2$, $R^3$, $R^4$, $R^6$, $R^7$, $Y^1$, $Y^2$, $Y^3$, $Y^6$, and $Y^7$ may each also be for example phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,3-,2,4- or 2,6-dimethylphenyl, 2-, 3- or 4-methoxyphenyl, 2-, 3-, or 4-ethoxyphenyl, 2,3-, 2,4- or 2,6-dimethoxyphenyl, 2-, 3- or 4-fluorophenyl 2-, 3- or 4-chlorophenyl, 2-, 3- or 4-bromophenyl or 2-, 3- or 4-nitrophenyl.

$R^5$ is for example mono- or dimethylcarbamoyl, mono- or diethylcarbamoyl, mono- or dipropylcarbamoyl, mono- or diisopropylcarbamoyl, mono- or dibutylcarbamoyl, mono- or dipentylcarbamoyl, mono- or dihexylcarbamoyl, mono- or diheptylcarbamoyl, mono- or dioctylcarbamoyl, mono- or bis(2-ethylhexyl)carbamoyl or N-methyl-N-ethylcarbamoyl. $L^2$, $L^8$, $L^9$ and $L^{11}$ may each also be for example methylthio, ethylthio, propylthio, isopropylthio, butylthio, isobutylthio, pentylthio, hexylthio, heptylthio, octylthio, 2-ethylhexylthio, benzylthio or 1- or 2-phenylethylthio.

$L^2$ and $L^8$ may each also be for example phenylthio, 2-methylphenylthio, 2-methoxyphenylthio or 2-chlorophenylthio.

$L^2$, $L^8$, $L^9$, $L^{15}$, $L^{16}$, $L^{17}$, $Y^4$ and $Y^5$ may each also be for example methoxy, ethoxy, propoxy, isopropoxy, butoxy, isobutoxy, sec-butoxy, pentyloxy, isopentyloxy, neopentyloxy, tert-pentyloxy, hexyloxy or 2-methylpentyloxy.

$L^2$, $L^8$ and $L^9$ may each also be for example benzyloxy or 1- or 2-phenylethoxy.

$L^6$ as well as $L^2$, $L^8$, $L^{13}$, $L^{14}$, $L^{15}$, $L^{16}$ and $L^{17}$ is for example fluorine, chlorine or bromine.

$L^7$ and $L^1$ as well as $B^1$, $B^2$, $L^2$, $L^8$, $L^{15}$, $L^{16}$ and $L^{17}$, are each for example methylsulfonyl, ethylsulfonyl, propylsulfonyl, isopropylsulfonyl, butylsulfonyl, isobutylsulfonyl sec-butylsulfonyl, pentylsulfonyl, isopentylsulfonyl, neopentylsulfonyl, hexylsulfonyl, heptylsulfonyl, octylsulfonyl, 2-ethylhexylsulfonyl, phenylsulfonyl, 2-methylphenylsulfonyl, 2-methoxyphenylsulfonyl or 2-chlorophenylsulfonyl.

$L^3$ and $L^9$ as well as $L^1$, $L^6$, $L^7$, $L^8$, $L^{14}$, $L^{15}$, $L^{16}$, $L^{17}$ and $R^5$ are each for example methoxycarbonyl, ethoxycarbonyl, propoxycarbonyl, isopropoxycarbonyl, butoxycarbonyl, isobutoxycarbonyl, sec-butoxycarbonyl, pentyloxycarbonyl, isopentyloxycarbonyl, neopentyloxycarbonyl, hexyloxycarbonyl, heptyloxycarbonyl, octyloxycarbonyl, isooctyloxycarbonyl or 2-ethylhexyloxycarbonyl.

$L^{15}$, $L^{16}$ and $L^{17}$ may each also be for example 2-phenoxyethoxycarbonyl, 2- or 3-phenoxypropobutoxycarbonyl or 2- or 4- phenoxybutocarbonyl.

$L^2$ and $L^8$ may each also be for example 2-methoxyethoxy, 2-ethoxyethoxy, 2- or 3-methoxypropoxy, 2- or 3-ethoxypropoxy, 2- or 4-methoxybutoxy, 2- or 4-ethoxybutoxy, 5-methoxypentyloxy, 5-ethoxypentyloxy, 6-methoxyhexyloxy or 6-ethoxyhexyloxy.

$L^{11}$ may also be for example dimethylamino, diethylamino, dipropylamino, diisopropylamino, dibutylamino, dipentylamino, dihexylamino or N-methyl-N-ethylamino.

$L^{12}$ may also be for example 2-methoxycarbonylethylthio or 2-ethoxycarbonylethylthio.

$L^9$ may also be for example 2- or 3-methylthienyl or 2-, 3- or 4-methylpyridyl.

$B^1$, $B^2$, $L^1$, $L^6$ and $L^7$ may each also be for example formyl, acetyl, propionyl, butyryl, pentanoyl or hexanoyl.

$B^1$ and $B^2$ may each also be for example heptanoyl, octanoyl, 2-ethylhexanoyl, isooctanoyl, nonanoyl, isononanoyl, benzoyl, 2-, 3- or 4-methylbenzoyl or 2-, 3- or 4-methoxybenzoyl.

$Y^4$ may also be for example acetylamino, propionylamino, methoxyacetylamino, benzoylamino, methoxycarbonylamino, ethoxycarbonylamino, methylsulfonylamino, ethylsulfonylamino, propylsulfonylamino, isopropylsulfonylamino, butylsulfonylamino, mono- or dimethylaminosulfonylamino, mono- or diethylaminosulfonylamino, mono- or dipropylaminosulfonylamino, mono- or diisopropylaminosulfonylamino, mono- or dibutylaminosulfonylamino or (N-methyl-N-ethylaminosulfonyl)amino.

In a —CH=T radical $L^1$ and $L^7$ where T is derived from an acidic-CH compound $H_2T$, said acidic-CH compounds $H_2T$ can be for example compounds of the formula

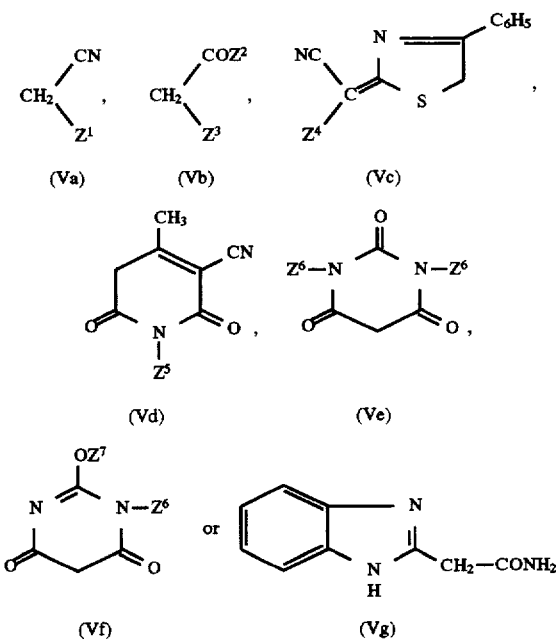

where $Z^1$ is cyano, nitro, $C_1$–$C_4$-alkanoyl, unsubstituted or $C_1$–$C_4$-alkyl-, $C_1$–$C_4$-alkoxy-, halogen- or nitro-substituted benzoyl, $C_1$–$C_4$-alkylsulfonyl, unsubstituted or $C_1$–$C_4$-alkyl-, $C_1$–$C_4$-alkoxy-, halogen- or nitro-substituted phenylsulfonyl, $C_1$–$C_4$-alkoxycarbonyl, $C_3$–$C_4$-alkenyloxycarbonyl, phenoxycarbonyl, carbamoyl, mono- or di($C_1$–$C_4$-alkyl)carbamoyl, unsubstituted or $C_1$–$C_4$-alkyl-, $C_1$–$C_4$-alkoxy-, halogen- or nitro-substituted phenylcarbamoyl, unsubstituted or $C_1$–$C_4$-alkyl-, $C_1$–$C_4$-alkoxy-, halogen- or nitro-substituted phenyl, benzothiazol-2-yl, benzimidazol-2-yl, 5-phenyl-1,3,4-thiadiazol-2-yl or 2-hydroxyquinoxalin-3-yl, $Z^2$ is $C_1$–$C_6$-alkyl, $C_1$–$C^6$-alkoxy or $C_3$–$C_4$-alkenyloxy, $Z^3$ is $C_1$–$C_4$-alkoxycarbonyl, $C_3$–$C_4$-alkenyloxycarbonyl, phenylcarbamoyl or benzimidazol-2-yl, $Z^4$ is cyano, $C_1$–$C_4$-alkoxycarbonyl or $C_3$–$C_4$-alkenyloxycarbonyl, $Z^5$ is hydrogen or $C_1$–$C_6$-alkyl, $Z^6$ is hydrogen, $C_1$–$C_6$-alkyl or phenyl, and $Z^7$ is $C_1$–$C_6$-alkyl.

Attention is drawn to the radical derived from compounds of the formula Va, Vb or Vc where $Z^1$ is cyano, $C_1$–$C_4$-alkanoyl, $C_1$–$C_4$-alkoxycarbonyl or $C_3$–$C_4$-alkenyloxycarbonyl, $Z^2$ is $C_1$–$C_4$-alkyl, $C_1$–$C_4$-alkoxy or $C_3$–$C_4$-alkenyloxy, $Z^3$ is $C_1$–$C_4$-alkoxycarbonyl or $C_3$–$C_4$-alkenyloxycarbonyl and $Z^4$ is cyano.

Particular attention is drawn to the radical derived from compounds of the formula Va, Vb or Vc where $Z^1$ is cyano, $C_1$–$C_4$-alkoxycarbonyl or $C_3$–$C_4$-alkenyloxycarbonyl, $Z^2$ is $C_1$–$C_4$-alkoxy or $C_2$–$C_4$-alkenyloxy, $Z^3$ is $C_1$–$C_4$-alkoxycarbonyl or C3–$C_4$-alkenyloxycarbonyl and $Z^4$ is cyano.

$R^1$ and $R^2$, $Y^1$ and $Y^2$ or $Y^6$ and $Y^7$ each combined with the nitrogen atom joining them together into a 5- or 6-membered saturated heterocyclic radical with or without further hetero atoms may be for example pyrrolidinyl, piperidinyl, morpholinyl, thiomorpholinyl, thiomorpholinyl-S,S-dioxide, piperazinyl or N-($C_1$–$C_4$-alkyl) piperazinyl, such as N-methyl- or N-ethyl-piperazinyl.

When $R^1$ and $R^2$ in the formula I are each $C_1$–$C_{10}$-alkyl, or when one of $R^1$ and $R^2$ is $C_1$–$C_{10}$-alkyl and the other is $C_5$–$C_7$-cycloalkyl, then preference is given to those pyridone dyes in the dye mixtures in which the sum of the carbon atoms present in the two radicals $R^1$ and $R^2$ is at least 7, preferably at least 8.

Preference is further given to dye mixtures which include one or more pyridone dyes of the formula I where X is CH.

Preference is further given to dye mixtures which include one or more pyridone dyes of the formula I where $R^4$ is methyl.

Preference is further given to dye mixtures which include one or more pyridone dyes of the formula I where $R^5$ is cyano.

Preference is further given to dye mixtures which include one or more pyridone dyes of the formula I where $R^3$ is $C_3$–$C_{10}$-alkyl, especially $C_3$–$C_8$-alkyl, attention being drawn to branched alkyl in each case, phenyl or thienyl.

Preference is further given to dye mixtures which include one or more pyridone dyes of the formula I where $R^6$ is $C_1$–$C_8$-alkyl, cyclopentyl, cyclohexyl or unsubstituted or $C_1$–$C_4$-alkyl- or $C_1$–$C_4$-alkoxy-substituted phenyl.

Preference is further given to dye mixtures which include one or more pyridone dyes of the formula I where $R^7$ is $C_1$–$C_8$-alkyl or unsubstituted or $C_1$–$C_4$-alkyl- or $C_1$–$C_4$-alkoxy-substituted phenyl.

Preference is further given to dye mixtures which include one or more pyridone dyes of the formula I where $R^1$ and $R^2$ are independently of each other $C_1$–$C_8$-alkyl, which may be unsubstituted or $C_1$–$C_4$-alkoxy-, $C_1$–$C_4$-alkoxycarbonyl- or phenyl-substituted, cyclopentyl, cyclohexyl or prop-1-en-3-yl.

Particular preference is given to dye mixtures which include one or more pyridone dyes of the formula I where $R^3$ is branched $C_3$–$C_6$-alkyl, especially isopropyl, isobutyl or tert-butyl. tert-Butyl is particularly preferred.

Particular preference is further given to dye mixtures which include one or more pyridone dyes of the formula I where $R^6$ is $C_4$–$C_8$-alkyl or cyclohexyl.

Particular preference is further given to dye mixtures which include one or more pyridone dyes of the formula I where $R^7$ is $C_1$–$C_8$-alkyl.

Particular preference is further given to dye mixtures which include one or more pyridone dyes of the formula I where $R^1$ and $R^2$ are independently of each other $C_4$–$C_8$-alkyl, $C_1$–$C_4$-alkoxy-$C_2$–$C_4$-alkyl, $C_1$–$C_4$-alkoxycarbonyl-$C_2$–$C_4$-alkyl, benzyl or prop-1-en-3-yl or where one of $R^1$ and $R^2$ is $C_1$–$C_4$-alkyl and the other is cyclohexyl.

Particular preference is further given to dye mixtures which include one or more pyridone dyes of the formula I where M is a radical of the formula

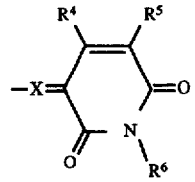

where $R^4$, $R^5$, $R^6$ and X are each as defined above.

Very particular preference is given to dye mixtures which include one or more pyridone dyes of the formula I where $R^1$ and $R^2$ are independently of each other $C_4$–$C_8$-alkyl, benzyl or prop-1-en-3-yl.

Preference is further given to dye mixtures which include one or more azo dyes of the formula II where D is a radical of the formula IIIb, IIId, IIIe or IIIq.

Particular preference is further given to dye mixtures which include one or more azo dyes of the formula II where D is a radical of the formula IIIb, IIId, IIIe or IIIq where $L^1$ is nitro, cyano, formyl or a radical of the formula —CH=T, where T is as defined above, $L^2$ is hydrogen, $C_1$–$C_6$-alkyl or halogen, $L^3$ is cyano, $C_1$–$C_6$-alkoxycarbonyl or nitro, $L^6$ is cyano or nitro, $L^7$ is nitro, cyano, formyl, $C_1$–$C_6$-alkoxycarbonyl or a radical of the formula —CH=T, where T is as defined above, $L^8$ is $C_1$–$C_6$-alkyl, unsubstituted or $C_1$–$C_4$-alkyl-, $C_1$–$C_4$-alkoxy-, halogen- or nitro-substituted phenyl, cyano, halogen or $C_1$–$C_6$-alkoxycarbonyl, $L^9$ is unsubstituted or phenyl-substituted $C_1$–$C_6$-alkyl, unsubstituted or phenyl-substituted $C_1$–$C_6$-alkylthio or unsubstituted or $C_1$–$C_4$-alkyl-, $C_1$–$C_4$-alkoxy-, halogen- or nitro-substituted phenyl or thienyl and $L^{15}$, $L^{16}$ and $L^{17}$ are independently of one another hydrogen, $C_1$–$C_6$-alkyl, $C_1$–$C_6$-alkoxy, nitro, cyano or unsubstituted or phenoxy-substituted $C_1$–$C_6$-alkoxycarbonyl or $L^{15}$ and $L^{16}$ are together a radical of the formula CO—NW—CO, where W is as defined above.

Of particular importance are dye mixtures which include one or more azo dyes of the formula II where D is a radical of the formula IIIe.

Preference is further given to dye mixtures which include one or more azo dyes of the formula II where $Y^1$, $Y^2$, $Y^6$ and $Y^7$ are independently of one another $C_1$–$C_6$-alkyl with or without substitution by hydroxyl, $C_1$–$C_4$-alkanoyloxy, $C_1$–$C_4$-alkoxycarbonyl, $C_1$–$C_4$-alkoxycarbonyloxy or phenyl and with or without interruption by 1 or 2 oxygen atoms in ether function.

Preference is further given to dye mixtures which include one or more azo dyes of the formula II where $Y^3$ is branched $C_3$–$C_{10}$-alkyl.

Preference is further given to dye mixtures which include one or more azo dyes of the formula II where $Y^5$ is hydrogen, $C_1$–$C_4$-alkyl, methoxy, ethoxy or $C_1$–$C_6$-alkanoylamino.

The dye mixtures of the present invention include typically from 5 to 95% by weight, preferably from 20 to 80% by weight, especially from 40 to 60% by weight, based on the weight of the dye mixture, of one or more pyridone dyes of the formula I and also from 5 to 95% by weight, preferably from 20 to 80% by weight, especially from 40 to 60% by weight, based on the weight of the dye mixture, of one or more azo dyes of the formula II.

The novel dye mixtures are obtainable in a conventional manner, for example by blending the individual dyes in the abovementioned weight ratio.

The pyridone dyes of the formula I are known per se and described for example in U.S. Pat. No. 5,079,365, in the prior patent applications PCT/EP 94/04114, PCT/EP 95/00564 or in the prior German patent application 19504943.8 or are obtainable by the methods mentioned therein. The thermal transfer of such dyes is described for example in the prior European patent application No. 95106055.7.

The azo dyes of the formula II are likewise known per se and described for example in the prior German patent application P 44 26 023.7. Those azo dyes with a coupling component of the aniline series can likewise be obtained by the methods mentioned therein or else as described in U.S. Pat. No. 5,283,326.

The dye mixtures of the present invention are notable for advantageous application properties. They display high solubility in the ink ribbon (good compatibility with the binder), high stability in the printing ink, good transferability, high image stability (i.e. good light fastness and also good stability to environmental effects, e.g. moisture, temperature or chemicals) and ensure a flexible coloristic adaptation to the other subtractive primary colors, which gives rise to high quality color spaces. In addition, the dye mixtures of the present invention make it possible to produce good blacks.

Attention is also drawn to the spectrally uniform decrease in the individual components on irradiation; that is, the individual dye having the lower light fastness does not usually decrease preferentially.

The present invention further provides a process for transferring dyes from a transfer to a plastic-coated paper by diffusion or sublimation with the aid of an energy source, which comprises using a transfer on which there is an above-defined dye mixture.

To make the transfers required for the process of the present invention, the dye mixtures are incorporated in a suitable organic solvent or a mixture of solvents with one or more binders with or without auxiliaries to form a printing ink. This printing ink preferably contains the dyes in a molecularly disperse, i.e. dissolved, form. The printing ink can be applied to the inert support by means of a doctor blade and air dried. Suitable organic solvents for the dye mixtures include for example those in which the solubility of the dye mixtures at a temperature of 20° C. is greater than 1% by weight, preferably greater than 5% by weight.

Examples are ethanol, propanol, isobutanol, tetrahydrofuran, methylene chloride, methyl ethyl ketone, cyclopentanone, cyclohexanone, toluene, chlorobenzene or mixtures thereof.

Suitable binders include all resins or polymer materials which are soluble in organic solvents and which are capable of binding the dye mixtures to the inert support sufficiently firmly as to prevent rubbing off. Preference is given to those binders which, after the air drying of the printing ink, include the dye mixture in the form of a clear, transparent film without any visible crystallization of the dye mixture.

Such binders are mentioned for example in U.S. Pat. No. 5,132,438 or in the pertinent patent applications cited therein. Also suitable are saturated linear polyesters.

Preferred binders include ethylcellulose, ethylhydroxyethylcellulose, polyvinyl butyral, polyvinyl acetate, cellulose propionate or saturated linear polyesters.

The weight ratio of binder: dye mixture generally ranges from 1:1 to 10:1.

Suitable auxiliaries include for example release agents as mentioned in U.S. Pat. No. 5,132,438 or the pertinent patent applications cited therein. Also suitable are especially organic additives which prevent the crystallizing out of the transfer dyes in the course of storage or on heating of the color ribbon, for example cholesterol or vanillin.

Suitable inert supports are described for example in U.S. Pat. No. 5,132,438 or in the pertinent patent applications cited therein. The thickness of the support generally ranges from 3 to 30 μm, preferably from 5 to 10 μm.

Suitable dye receiver layers include in principle all thermally stable plastics layers with affinity for the dyes to be transferred, for example modified polycarbonates or polyesters. Further details can be found for example in U.S. Pat. No. 5,132,438 or the pertinent patent applications cited therein.

The transfer is effected by means of an energy source, for example by means of a laser or a thermal head, for which the latter has to be heatable to a temperature of $\geq 300$ °C. so that the transfer of the dye can take place within the time range t: $0<t<15$ msec. The dye migrates out of the transfer sheet and diffuses into the surface coating of the receiving medium.

The dye mixtures of the present invention are also advantageously suitable for dyeing or printing synthetic materials, for example polyesters, polyamides or polycarbonates. Particularly suitable are textile materials such as fibers, yarns, threads, knits, wovens or nonwovens composed of polyester, modified polyester, eg. anionically modified polyester, or, blend fabrics of polyesters with cellulose, cotton, viscose or wool. The dyeing and printing conditions are known per se. The dyes of this invention can also be used for dyeing keratinous fibers, for example in hair dyeing or for dyeing furs.

The novel dye mixtures are also advantageously suitable for producing color filters as described for example in EP-A-399 473.

Finally, they can also be used with advantage as colorants for making toners for electrophotography.

The Examples which follow illustrate the invention.

Tables 1 to 5 below list the individual dyes used as blending partners.

TABLE 1

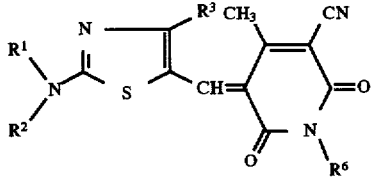

| Dye No. | NR¹R² | R³ | R⁶ |
|---|---|---|---|
| 1 | N(C₄H₉)₂ | C(CH₃)₃ | CH₃ |
| 2 | N(C₄H₉)₂ | C(CH₃)₃ | C₄H₉ |
| 3 | N(C₄H₉)₂ | C(CH₃)₃ | C₂H₄OCH₃ |
| 4 | N(C₄H₉)₂ | C(CH₃)₃ | C₃H₆OCH₃ |

TABLE 1-continued

[Structure: compound with R¹R²N-C(=N-)-S- group connected through CH=C(CH₃)- to a cyclic system with R³, CN, two C=O groups, and N-R⁶]

5

| Dye No. | NR¹R² | R³ | R⁶ |
|---|---|---|---|
| 5 | N[CH(CH₃)C₂H₅]₂ | C(CH₃)₃ | CH₃ |
| 6 | N[CH(CH₃)C₂H₅]₂ | C(CH₃)₃ | C₄H₉ |
| 7 | N(C₂H₅)₂ | C(CH₃)₃ | CH(CH₃)C₂H₅ |
| 8 | N(C₂H₅)₂ | C(CH₃)₃ | CH₃ |
| 9 | N(C₂H₅)₂ | C(CH₃)₃ | C₄H₉ |
| 10 | N(C₄H₉)₂ | C(CH₃)₃ | C₂H₅ |
| 11 | N(CH₃)₂ | (C(CH₃)₃ | C₃H₆OC₂H₄OC₂H₅ |
| 12 | N(CH₃)₂ | (C(CH₃)₃ | C₄H₉ |

TABLE 2

$$D-N=N-K$$

| Dye No. | D | K |
|---|---|---|
| 13 | 4-cyano-3-methyl-isothiazol-5-yl | 4-[N(C₄H₉)₂]phenyl |
| 14 | 4-cyano-3-methyl-isothiazol-5-yl | 4-[N(CH₃)(C₂H₅)]phenyl |
| 15 | 4-cyano-3-methyl-isothiazol-5-yl | 4-[N(C₃H₇)(CH₃)]phenyl |
| 16 | 4-cyano-3-methyl-isothiazol-5-yl | 4-[N(CH₂C₆H₅)(C₂H₄OCOOCH₃)]phenyl |
| 17 | 4-cyano-3-methyl-isothiazol-5-yl | 4-[N(CH₃)(C₂H₄OCOOC₂H₄OC₂H₅)]phenyl |
| 18 | 4-cyano-3-isopropyl-isothiazol-5-yl | 4-[N(CH₂C₆H₅)(C₂H₄OCOOCH₃)]phenyl |
| 19 | 4-cyano-3-isopropyl-isothiazol-5-yl | 4-[N(CH₂C₆H₅)(C₂H₄OCOOC₂H₅)]phenyl |
| 20 | 4-cyano-3-phenyl-isothiazol-5-yl | 4-[N(C₂H₅)₂]phenyl |

TABLE 2-continued

D—N=N—K

| Dye No. | D | K |
|---|---|---|
| 21 | 3-C₆H₅, 4-CN, 5-CH₃ isothiazole | 4-[N(CH₃)(CH(CH₃)₂)]phenyl |
| 22 | 3-CH₃, 4-CN, 5-CH₃ isothiazole | 4-N(C₂H₅)₂ phenyl |
| 23 | 3-CH₃, 4-CN, 5-CH₃ isothiazole | 4-N(C₂H₅)₂, 2-NHCOOC₂H₄OC₂H₅ phenyl |
| 24 | 3-CH(CH₃)₂, 4-CN, 5-CH₃ isothiazole | 4-N(C₄H₉)₂, 3,5-di-CH₃ phenyl |
| 25 | 3-(3-thienyl), 4-CN, 5-CH₃ isothiazole | 4-N(C₄H₉)₂, 3,5-di-CH₃ phenyl |
| 26 | 3-CH₃, 4-CN, 5-CH₃ isothiazole | 3-C(CH₃)₃, 4-CH₃, 2-N(C₄H₉)₂ thiazole |
| 27 | 3-CH₃, 4-CN, 5-CH₃ isothiazole | 3-C(CH₃)₃, 4-CH₃, 2-N(CH₂C₆H₅)₂ thiazole |
| 28 | 3-CH₃, 4-CN, 5-CH₃ isothiazole | 4-N(C₄H₉)₂, 2-C(CH₃)₃ phenyl |
| 29 | 3-CH₃, 4-CN, 5-CH₃ isothiazole | 4-N(CH₃)₂ phenyl |
| 30 | 3-CH₃, 4-CN, 5-CH₃ isothiazole | 3-C(CH₃)₃, 4-CH₃, 2-N(C₂H₅)₂ thiazole |

TABLE 2-continued

| Dye No. | D | K |
|---|---|---|
| 31 | 3-CH₃, 4-CN, 5-Me isothiazole | 4-cyclohexyl-5-Me thiazole-2-C(=N-)N(C₂H₅)(C₃H₆OCH₃) |
| 32 | 3-CH₃, 4-CN, 5-Me isothiazole | 4-cyclohexyl-5-Me thiazole-2-C(=N-)N(C₂H₄OCH₃)₂ |
| 33 | 3-C₆H₅, 4-CN, 5-Me isothiazole | 4-cyclohexyl-5-Me thiazole-2-C(=N-)N(C₂H₅)(C₃H₆OCH₃) |
| 34 | 3-C₆H₅, 4-CN, 5-Me isothiazole | 4-cyclohexyl-5-Me thiazole-2-C(=N-)N(C₂H₄OCH₃)₂ |
| 35 | 3-C₆H₅, 4-CN, 5-Me isothiazole | 4-cyclohexyl-5-Me thiazole-2-C(=N-)N(C₃H₇)(C₃H₆OC₂H₄OCH₃) |
| 36 | 3-C₂H₅, 4-CN, 5-Me isothiazole | 4-cyclohexyl-5-Me thiazole-2-C(=N-)N(C₂H₅)(C₃H₆OCH₃) |
| 37 | 3-CH₃OC₂H₄, 4-CN, 5-Me isothiazole | 4-cyclohexyl-5-Me thiazole-2-C(=N-)N(C₂H₅)(C₃H₆OCH₃) |

TABLE 2-continued
D—N=N—K
| Dye No. | D | K |
|---|---|---|
| 38 | 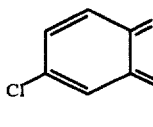 | 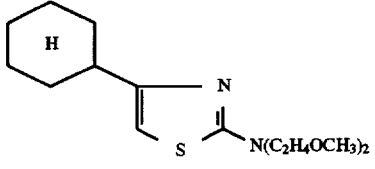 |
| 39 | 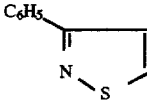 | 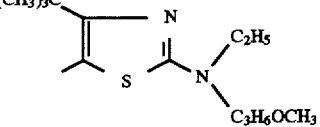 |
| 40 | 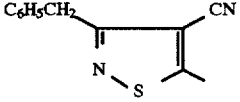 | 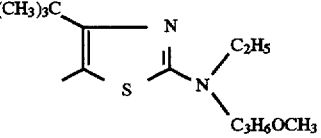 |
| 41 | 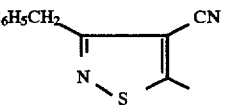 | 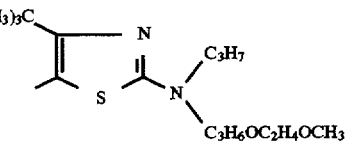 |
| 42 | 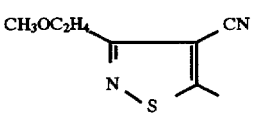 | 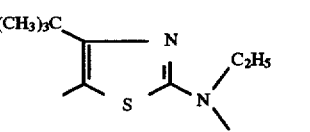 |
| 43 |  | 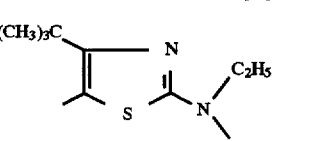 |
| 44 |  | 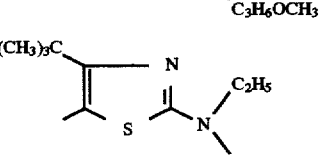 |
| 45 |  | 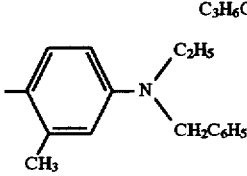 |
| 46 | 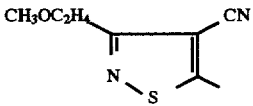 | 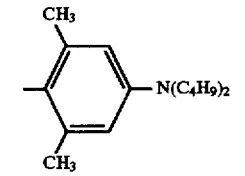 |
| 47 |  | 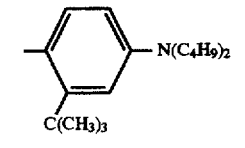 |

TABLE 2-continued
| Dye No. | D | K |
|---|---|---|
| 48 | 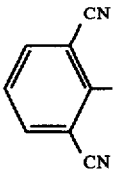 | 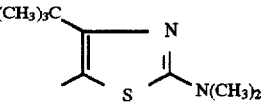 |
| 49 | 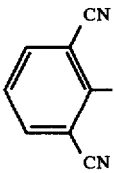 | 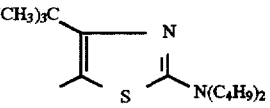 |
TABLE 3
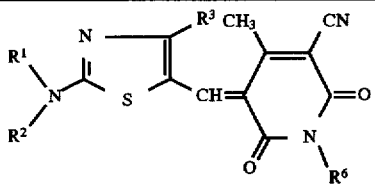
| Dye No. | NR¹R² | R³ | R⁶ |
|---|---|---|---|
| 50 | $N(C_2H_5)_2$ | 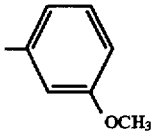 | $C_6H_{13}$ |
| 51 | $N(C_4H_9)_2$ |  |  |
| 52 | $N[CH_2CH(CH_3)_2]_2$ | 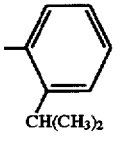 |  |
| 53 | $N(C_2H_5)_2$ | 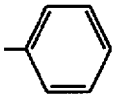 | $C_4H_9$ |
| 54 | $N(CH_2-CH=CH_2)_2$ |  | $CH_3$ |
| 55 | $N(CH_2-CH=CH_2)_2$ |  | $C_4H_9$ |
| 56 | $N(C_4H_9)_2$ |  | $CH_3$ |

TABLE 3-continued

[Structure: thiazole-based dye with substituents R¹, R², R³, CH₃, CN, R⁶]

| Dye No. | NR¹R² | R³ | R⁶ |
|---|---|---|---|
| 57 | N(C₂H₅)₂ | 4-F-C₆H₄— | C₄H₉ |
| 58 | N(C₄H₉)₂ | 2-thienyl | C₆H₁₃ |
| 59 | N(C₄H₉)₂ | 3-thienyl | C₆H₁₃ |
| 60 | N(CH(CH₃)₂)(2-CH₃O-C₆H₄) | C₆H₅— | C₆H₁₃ |
| 61 | N(C₄H₉)₂ | 2-CH₃-C₆H₄— | CH₃ |
| 62 | N(C₄H₉)₂ | C₆H₅— | CH₂CH(C₂H₅)C₄H₉ |
| 63 | N(C₄H₉)₂ | C₆H₅— | N(COCH₃)(COC₆H₅) |
| 64 | N(C₂H₅)(C₂H₄OC₄H₉) | 4-Cl-C₆H₄— | N(COCH₃)(COC₆H₅) |
| 65 | N(C₂H₅)(C₂H₄OC₄H₉) | 4-Cl-C₆H₄— | C₄H₉ |
| 66 | N(C₂H₅)(C₂H₄OC₄H₉) | 4-Cl-C₆H₄— | C₆H₁₃ |
| 67 | N(C₂H₄OCH₃)₂ | C₆H₅— | NHCOCH(C₂H₅)C₄H₉ |
| 68 | N(C₂H₄OCH₃)₂ | C₆H₅— | C₆H₁₃ |

TABLE 3-continued

[Structure: R¹R²N-C(=N-)(-S-)C(R³)=C(-)-CH=C(CH₃)-C(CN)=C(-N(R⁶)-C(=O)-)C(=O)-]

| Dye No. | NR¹R² | R³ | R⁶ |
|---|---|---|---|
| 69 | N(C₂H₄OCH₃)₂ | phenyl | CH₃ |
| 70 | N(C₂H₅)(C₂H₄OC₄H₉) | 4-Cl-phenyl | H |
| 71 | N[(C₂H₄O)₃CH₃]₂ | phenyl | CH₃ |
| 72 | N[(C₂H₄O)₃CH₃]₂ | phenyl | C₄H₉ |
| 73 | N[(C₂H₄O)₃CH₃]₂ | phenyl | C₆H₁₃ |
| 74 | N[(C₂H₄O)₃CH₃]₂ | phenyl | H |
| 75 | N(C₄H₉)₂ | phenyl | C₆H₁₃ |

TABLE 4

[Structure: thiazole fused system with R¹R²N-, R³, CH₃, CN, R⁶ substituents]

| Dye No. | NR¹R² | R³ | R⁶ |
|---|---|---|---|
| 76 | N(C₄H₉)₂ | 2-thienyl | C₆H₁₃ |
| 77 | N(C₄H₉)₂ | 2-thienyl | C₃H₆OCH₃ |
| 78 | N[CH₂CH(C₂H₅)C₄H₉]₂ | phenyl | C₆H₁₃ |
| 79 | N(C₂H₅)(C₂H₄OC₄H₉) | 4-Cl-phenyl | CH₃ |

TABLE 5

D—N=N—K

| Dye No. | D | K |
|---|---|---|
| 80 | 3-Cl, 4-CN, 5-CH₃, 2-CHO thiophene | 4-(N(CH₃)(C₄H₉))phenyl |
| 81 | 3-Cl, 4-CN, 5-CH₃ thiophene with 2-CH=C(CN)(COOC₄H₉) | 4-(N(C₆H₁₃)(C₄H₉))phenyl |
| 82 | 3-Cl, 4-CN, 5-CH₃ thiophene with 2-CH=C(CN)(COOC₄H₉) | 4-N(C₄H₉)₂, 3-CH₃ phenyl |
| 83 | 3-Cl, 4-CN, 5-CH₃, 2-CHO thiophene | 4-N(C₂H₅)₂ phenyl |
| 84 | 3-Cl, 4-CN, 5-CH₃, 2-CHO thiophene | 2-thienyl substituted methylthiazole with N(C₄H₉)₂ |
| 85 | 3-CH₃, 4-CN, 5-CH₃, 2-COOCH₃ thiophene | 4-N(C₂H₅)₂ phenyl |
| 86 | 3-Cl, 4-CN, 5-CH₃, 2-CHO thiophene | 2-OCH₃, 5-N(C₆H₁₃)₂, 4-NHCOCH₃ phenyl |
| 87 | 3-Cl, 4-CN, 5-CH₃ thiophene with 2-CH=C(CN)₂ | CH(C₂H₅)C₄H₉-substituted methylthiazole with N[CH(CH₃)₂]₂ |
| 88 | 3-Cl, 4-CN, 5-CH₃ thiophene with 2-C(CN)=C(B) (B = Mixture of CN and COOC₄H₉) | cyclohexyl-substituted methylthiazole with N(C₂H₄OCH₃)₂ |
| 89 | 3-CH₃, 4-CN, 5-CH₃, 2-CN thiophene | cyclohexyl-substituted methylthiazole with N(C₂H₅)(C₃H₆OCH₃) |

TABLE 5-continued
D—N=N—K
| Dye No. | D | K |
|---|---|---|
| 90 | 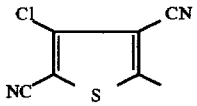 | 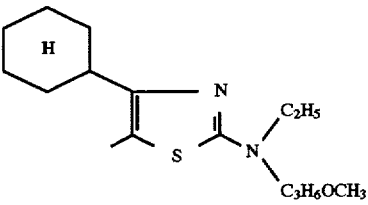 |
| 91 | 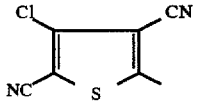 | 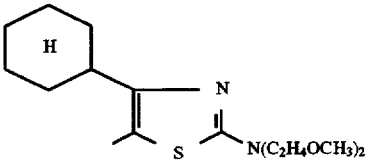 |
| 92 | 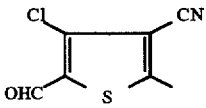 | 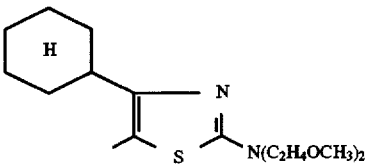 |
| 93 | 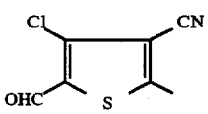 | 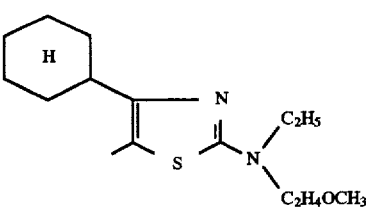 |
| 94 | 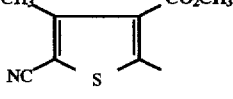 | 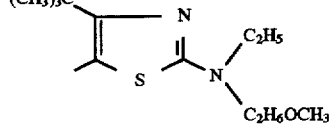 |
| 95 | 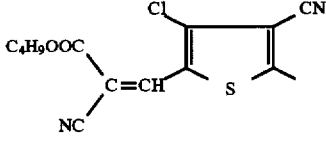 | 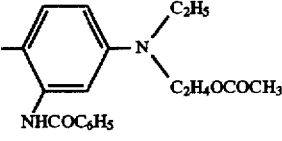 |
| 96 | 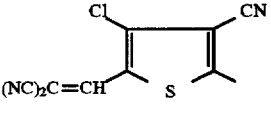 | 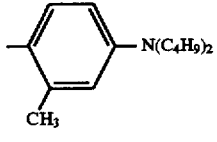 |
| 97 | 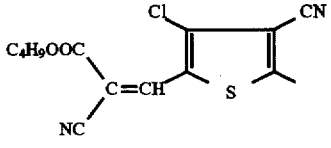 | 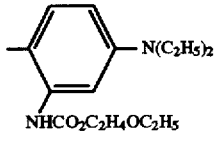 |
| 98 | 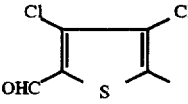 | 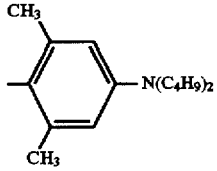 |

TABLE 5-continued $$D-N=N-K$$

| Dye No. | D | K |
|---|---|---|
| 99 | C₄H₉OOC, NC, C=CH, Cl, CN, S (thiophene) | (CH₃)₃C, N, S, N(C₄H₉)₂ |
| 100 | C₆H₅—N=N, Cl, CN, S (thiophene) | —C₆H₄—N(C₂H₅)₂ |
| 101 | CH₃, C₂H₅OOC, S (thiophene), N | —C₆H₃(NHCOCH₃)—N(C₂H₅)₂ |

TABLE 6

Structure with $R^1R^2N$—, $R^3$, CH₃, CN, and $R^7$ substituents on a thiophene-pyridone azamethine dye.

| Dye No. | NR¹R² | R³ | R⁷ |
|---|---|---|---|
| 102 | N(C₂H₅)(C₄H₉) | —C₆H₅ | CH(C₂H₅)C₄H₉ |
| 103 | N(C₂H₅)(CH₂C₆H₅) | C(CH₃)₃ | CH(C₂H₅)C₄H₉ |
| 104 | N(C₂H₄OCH₃)₂ | —C₆H₅ | CH(C₂H₅)C₄H₉ |
| 105 | N(CH₂C₆H₅)₂ | —C₆H₅ | CH(C₂H₅)C₄H₉ |
| 106 | N(C₂H₅)₂ | (C(CH₃)₃) | CH(C₂H₅)C₄H₉ |
| 107 | N(C₄H₉)₂ | —C₆H₅ | CH(C₂H₅)C₄H₉ |
| 108 | N[CH(CH₃)₂]₂ | —C₆H₅ | CH(C₂H₅)C₄H₉ |

Procedure for thermal transfer:

a) 10 g of dye mixture are stirred, if necessary with brief heating to 80°–90° C., into 100 g of a 10% strength by weight solution of a binder based on polyvinyl butyral in 4.5:2:2 v/v/v methyl ethyl ketone/toluene/cyclohexanone.

The mixture is applied with a 10 μm doctor blade to a 6 μm thick polyester film which has a suitable slipping layer on the back and is blown dry with a hair dryer in the course of 1 minute. Before the color ribbon can be printed, it has to be air dried for at least a further 24 hours, since residual solvent can impair the printing process.

b) The color ribbons are printed on an experimental computer-controlled apparatus equipped with a commercial thermal printing head onto commercial color videoprint paper (Hitachi).

The voltage is altered to control the energy emitted by the thermal printing head, the length of a pulse having been set to 7 ms and only one pulse being emitted at a time. The emitted energy level ranges from 0.5 to 2.0 mJ/dot.

Since the depth of the color is directly proportional to the supplied energy, it is possible to use a color wedge for spectroscopic evaluation.

The depth of the color is plotted against the supplied energy per heating element to determine the Q* value (=energy in mJ for the absorbance value of 1) and the gradient m in 1/mJ.

The results obtained are shown together with the $\lambda_{max}$ values (measured on the videoprint paper) below in Table 7.

Table 7 also lists the light fastness (LF) values of some dye mixtures. The value reported is the number of hours of irradiation after which 20% of the original dye quantity was destroyed.

TABLE 7

| Mixture of dyes | Weight ratio | $\lambda_{max}$ [nm] | LF [h] | Q* [mJ/dot] | m* [1/mJ] |
|---|---|---|---|---|---|
| 1/30 | 1:1 | | | 0,74 | 3,58 |
| 1/15 | 1:1 | 537 | 18 | 0,74 | 3,98 |
| 1/14 | 1:1 | 537 | 12 | 0,75 | 4,74 |

TABLE 7-continued

| Mixture of dyes | Weight ratio | $\lambda_{max}$ [nm] | LF [h] | Q* [mJ/dot] | m* [1/mJ] |
|---|---|---|---|---|---|
| 1/22 | 1:1 | 535 | 27 | 0,76 | 4,01 |
| 1/17 | 1:1 | 537 | 23 | 0,78 | 3,62 |
| 1/24 | 1:1 | 537 | 22 | 0,78 | 3,77 |
| 1/28 | 1:1 | 537 | 20 | 0,78 | 3,17 |
| 1/20 | 1:1 | 537 | 12 | 0,79 | 4,23 |
| 1/21 | 1:1 | 537 | 15 | 0,79 | 3,55 |
| 1/13 | 1:1 | 537 | 18 | 0,80 | 3,35 |
| 1/25 | 1:1 | 537 | 16 | 0,80 | 3,18 |
| 1/16 | 1:1 | 535 | 15 | 0,81 | 3,44 |
| 1/18 | 1:1 | 534 | 21 | 0,81 | 2,97 |
| 1/19 | 1:1 | 537 | 23 | 0,81 | 3,57 |
| 1/23 | 1:1 | 537 | 36 | 0,81 | 2,76 |
| 1/26 | 1:1 | 536 |  | 0,83 | 3,70 |
| 1/47 | 1:1 | 537 | 20 | 0,78 | 3,17 |
| 1/48 | 1:1 | 534 |  | 0,83 | 3,42 |
| 1/27 | 1:1 | 536 |  | 0,84 | 3,37 |
| 1/101 | 1:1 | 537 |  | 0,84 | 2,85 |
| 1/85 | 1:1 | 537 |  | 0,88 | 2,71 |
| 1/49 | 1:1 | 534 |  | 0,94 | 2,79 |
| 2/31 | 1:1 |  |  | 0,82 | 3,76 |
| 2/26 | 1:1 | 535 |  | 0,89 | 3,01 |
| 2/49 | 1:1 | 536 |  | 0,94 | 2,75 |
| 3/14 | 1:1 | 537 | 18 | 0,79 | 4,05 |
| 3/15 | 1:1 | 537 | 19 | 0,79 | 4,09 |
| 3/28 | 1:1 | 537 | 19 | 0,79 | 3,62 |
| 3/22 | 1:1 | 537 | 26 | 0,81 | 3,75 |
| 3/17 | 1:1 | 537 | 31 | 0,82 | 3,42 |
| 3/24 | 1:1 | 537 | 17 | 0,82 | 3,77 |
| 3/25 | 1:1 | 537 | 31 | 0,82 | 3,61 |
| 3/26 | 1:1 | 537 |  | 0,82 | 3,39 |
| 3/13 | 1:1 | 537 | 22 | 0,83 | 3,47 |
| 3/20 | 1:1 | 537 | 16 | 0,83 | 4,06 |
| 3/21 | 1:1 | 537 | 16 | 0,83 | 3,31 |
| 3/16 | 1:1 | 537 | 24 | 0,85 | 3,21 |
| 3/18 | 1:1 | 534 | 24 | 0,85 | 3,18 |
| 3/49 | 1:1 | 535 |  | 0,86 | 2,46 |
| 3/27 | 1:1 | 537 |  | 0,87 | 2,77 |
| 3/85 | 1:1 | 537 |  | 0,88 | 2,76 |
| 3/19 | 1:1 | 537 | 18 | 0,88 | 2,79 |
| 3/101 |  | 537 |  | 0,88 | 2,80 |
| 3/23 | 1:1 |  | 26 |  |  |
| 3/47 | 1:1 | 537 | 19 | 0,79 | 3,62 |
| 4/14 | 1:1 | 537 | 15 | 0,75 | 4,16 |
| 4/15 | 1:1 | 537 | 24 | 0,76 | 3,98 |
| 4/22 | 1:1 | 537 | 21 | 0,77 | 3,92 |
| 4/24 | 1:1 | 537 | 22 | 0,79 | 3,82 |
| 4/25 | 1:1 | 536 | 48 | 0,79 | 3,82 |
| 4/28 | 1:1 | 536 | 23 | 0,79 | 3,79 |
| 4/17 | 1:1 | 534 | 20 | 0,80 | 3,48 |
| 4/20 | 1:1 | 537 | 12 | 0,80 | 3,12 |
| 4/21 | 1:1 | 537 | 15 | 0,80 | 3,57 |
| 4/13 | 1:1 | 537 | 27 | 0,81 | 3,39 |
| 4/19 | 1:1 | 537 | 15 | 0,82 | 3,79 |
| 4/18 | 1:1 | 535 | 18 | 0,83 | 3,25 |
| 4/16 | 1:1 | 537 | 20 | 0,84 | 3,26 |
| 4/26 | 1:1 | 537 |  | 0,84 | 3,00 |
| 4/23 | 1:1 | 538 | 26 | 0,86 | 2,86 |
| 4/27 | 1:1 | 537 |  | 0,87 | 2,81 |
| 4/47 | 1:1 | 536 | 23 | 0,79 | 3,79 |
| 4/101 | 1:1 | 534 |  | 0,88 | 2,90 |
| 4/48 | 1:1 | 537 |  | 0,89 | 3,06 |
| 4/85 | 1:1 | 537 |  | 0,91 | 2,60 |
| 5/14 | 1:1 | 537 | 23 | 0,75 | 4,11 |
| 5/15 | 1:1 | 538 | 23 | 0,75 | 4,23 |
| 5/29 | 1:1 | 537 | 17 | 0,77 | 3,49 |
| 5/28 | 1:1 | 539 | 31 | 0,78 | 3,01 |
| 5/20 | 1:1 | 537 | 24 | 0,79 | 3,77 |
| 5/22 | 1:1 | 537 | 32 | 0,79 | 4,02 |
| 5/17 | 1:1 | 539 | 39 | 0,81 | 3,31 |
| 5/21 | 1:1 | 537 | 22 | 0,81 | 3,31 |
| 5/24 | 1:1 | 538 | 19 | 0,81 | 3,56 |
| 5/16 | 1:1 | 537 | 30 | 0,82 | 3,27 |
| 5/25 | 1:1 | 537 | 26 | 0,82 | 3,27 |
| 5/13 | 1:1 | 538 | 24 | 0,83 | 3,61 |
| 5/18 | 1:1 | 537 | 37 | 0,84 | 3,31 |
| 5/27 | 1:1 | 537 |  | 0,84 | 2,99 |
| 5/48 | 1:1 | 537 |  | 0,84 | 3,46 |
| 5/19 | 1:1 | 537 | 33 | 0,85 | 3,02 |
| 5/26 | 1:1 | 538 |  | 0,85 | 3,02 |
| 5/45 | 1:1 |  |  | 0,79 | 3,96 |
| 5/47 | 1:1 | 536 | 23 | 0,79 | 3,79 |
| 5/101 | 1:1 | 538 |  | 0,88 | 2,80 |
| 5/49 | 1:1 | 537 |  | 0,89 | 2,77 |
| 5/23 | 1:1 | 539 | 33 | 0,92 | 2,57 |
| 5/85 | 1:1 | 539 |  | 0,94 | 2,43 |
| 6/14 | 1:1 | 537 | 26 | 0,74 | 4,80 |
| 6/15 | 1:1 | 537 | 31 | 0,75 | 4,44 |
| 6/13 | 1:1 | 538 | 19 | 0,80 | 3,95 |
| 6/49 | 1:1 | 537 |  | 0,81 | 2,80 |
| 6/26 | 1:1 | 539 |  | 0,83 | 3,25 |
| 6/23 | 1:1 | 539 | 35 | 0,87 | 2,88 |
| 6/101 | 1:1 | 538 |  | 0,88 | 2,67 |
| 6/27 | 1:1 | 537 |  | 0,91 | 2,49 |
| 6/85 | 1:1 | 537 |  | 0,94 | 2,30 |
| 7/29 | 1:1 | 536 | 13 | 0,78 | 3,38 |
| 7/14 | 1:1 | 534 | 20 | 0,78 | 4,12 |
| 7/15 | 1:1 | 534 | 24 | 0,79 | 3,69 |
| 7/23 | 1:1 | 534 | 30 | 0,80 | 3,34 |
| 7/22 | 1:1 | 534 | 23 | 0,81 | 3,64 |
| 7/26 | 1:1 | 533 |  | 0,81 | 3,35 |
| 7/28 | 1:1 | 535 | 24 | 0,81 | 3,52 |
| 7/20 | 1:1 | 536 | 16 | 0,82 | 3,33 |
| 7/24 | 1:1 | 534 | 30 | 0,82 | 2,87 |
| 7/47 | 1:1 | 535 | 24 | 0,81 | 3,52 |
| 7/25 | 1:1 | 533 | 25 | 0,82 | 3,45 |
| 7/48 | 1:1 | 533 |  | 0,82 | 3,25 |
| 7/17 | 1:1 | 533 | 30 | 0,83 | 2,85 |
| 7/21 | 1:1 | 534 | 16 | 0,83 | 3,21 |
| 7/13 | 1:1 | 535 | 32 | 0,84 | 3,12 |
| 7/27 | 1:1 | 534 |  | 0,84 | 3,22 |
| 7/49 | 1:1 | 533 |  | 0,84 | 3,11 |
| 7/16 | 1:1 | 533 | 24 | 0,85 | 3,05 |
| 7/101 | 1:1 | 534 |  | 0,85 | 2,99 |
| 7/18 | 1:1 | 533 | 26 | 0,86 | 3,04 |
| 7/19 | 1:1 | 533 | 26 | 0,88 | 2,75 |
| 7/85 | 1:1 | 534 |  | 0,92 | 2,49 |
| 8/30 | 1:1 |  |  | 0,73 | 3,37 |
| 8/26 | 1:1 | 532 | 31 | 0,85 | 3,54 |
| 8/27 | 1:1 | 534 | 44 | 0,88 | 3,13 |
| 9/30 | 1:1 |  |  | 0,75 | 3,38 |
| 9/26 | 1:1 | 536 | 34 | 0,80 | 3,79 |
| 9/27 | 1:1 | 532 | 44 | 0,81 | 4,16 |
| 10/24 | 1:1 |  | 34 | 0,86 | 3,23 |
| 11/24 | 1:1 |  | 22 | 0,82 | 3,22 |
| 11/46 | 1:1 |  | 53 | 0,84 | 3,20 |
| 12/28 | 1:1 |  |  | 0,79 | 3,88 |
| 12/45 | 1:1 |  |  | 0,80 | 3,50 |
| 50/26 | 1:1 |  |  | 0,88 | 2,48 |
| 51/26 | 1:1 |  |  | 0,90 | 2,49 |
| 52/26 | 1:1 |  |  | 0,87 | 2,75 |
| 53/26 | 1:1 |  |  | 0,88 | 2,83 |
| 54/26 | 1:1 |  |  | 0,87 | 2,83 |
| 55/26 | 1:1 |  |  | 0,89 | 2,80 |
| 56/26 | 1:1 |  |  | 0,87 | 2,69 |
| 57/26 | 1:1 |  |  | 0,87 | 2,58 |
| 58/26 | 1:1 |  |  | 0,89 | 2,40 |
| 59/26 | 1:1 |  |  | 0,93 | 2,26 |
| 60/26 | 1:1 |  |  | 0,93 | 2,34 |
| 61/26 | 1:1 |  |  | 0,84 | 2,86 |
| 62/26 | 1:1 |  |  | 0,81 | 2,81 |
| 63/26 | 1:1 | 541 |  | 0,86 | 2,62 |
| 68/42 | 1:1 |  |  | 0,89 | 2,64 |
| 70/42 | 1:1 |  |  | 1,06 | 2,01 |
| 70/89 | 1:1 |  |  | 1,25 | 1,48 |
| 72/37 | 1:1 |  |  | 0,97 | 2,11 |
| 72/94 | 1:1 |  |  | 0,97 | 2,16 |
| 73/34 | 1:1 |  |  | 1,04 | 1,79 |
| 75/24 | 1:1 |  | 17 | 0,90 | 2,76 |
| 79/41 | 1:1 |  |  | 0,96 | 2,08 |
| 79/92 | 1:1 |  |  | 1,08 | 1,67 |
| 80/76 | 1:1 |  |  | 0,82 | 1,99 |
| 80/77 | 1:1 |  |  | 0,82 | 2,12 |

TABLE 7-continued

| Mixture of dyes | Weight ratio | λ_max [nm] | LF [h] | Q* [mJ/dot] | m* [1/mJ] |
|---|---|---|---|---|---|
| 80/78 | 1:1 | | | 0,81 | 1,82 |
| 81/76 | 1:0,6 | | | 0,95 | 1,32 |
| 81/77 | 1:1 | | | 0,86 | 1,54 |
| 81/78 | 1:1 | | | 0,98 | 1,15 |
| 82/76 | 1:1 | | | 0,90 | 1,82 |
| 82/77 | 1:1 | | | 0,90 | 2,36 |
| 82/78 | 1:1 | | | 0,89 | 1,33 |
| 83/76 | 1:1 | | | 0,90 | 2,20 |
| 83/77 | 1:1 | | | 0,89 | 2,44 |
| 83/78 | 1:1 | | | 0,90 | 2,16 |
| 84/76 | 1:1 | | | 0,98 | 1,57 |
| 84/77 | 1:1 | | | 1,04 | 1,54 |
| 84/78 | 1:1 | | | 1,03 | 1,33 |
| 86/76 | 1:1 | | | 0,91 | 1,45 |
| 86/77 | 1:1 | | | 0,88 | 1,51 |
| 86/78 | 1:1 | | | 0,92 | 1,77 |
| 87/76 | 1:1 | | | 0,92 | 2,14 |
| 87/77 | 1:1 | | | 0,97 | 1,40 |
| 87/78 | 1:1 | | | 0,93 | 1,47 |
| 102/23 | 1:1 | | 24 | 0,92 | 2,58 |
| 102/45 | 1:1 | | | 0,87 | 2,73 |
| 103/24 | 1:1 | | 24 | 0,84 | 3,28 |
| 103/28 | 1:1 | | 20 | 0,82 | 3,44 |
| 104/40 | 1:1 | 558 | 14 | 0,96 | 2,31 |
| 104/92 | 1:1 | 565 | | 1,00 | 2,05 |
| 105/23 | 1:1 | | 25 | 0,95 | 2,48 |
| 106/24 | 1:1 | | 19 | 0,82 | 3,45 |
| 107/82 | 1:1 | 634 | 16 | 0,88 | 2,15 |
| 107/87 | 1:1 | | | 1,11 | 1,29 |
| 107/95 | 1:1 | | | 1,11 | 1,61 |
| 107/96 | 1:1 | | | 1,00 | 1,83 |
| 107/97 | 1:1 | | | 1,09 | 1,67 |
| 107/98 | 1:1 | | | 1,04 | 1,81 |
| 107/99 | 1:1 | | | 1,08 | 1,58 |
| 107/100 | 1:1 | | | 1,08 | 1,77 |
| 108/82 | 1:1 | 621 | | 0,88 | 2,76 |
| 108/98 | 1:1 | 623 | | 1,00 | 2,30 |

The novel dye mixtures have unexpectedly high light fastness values. In some instances, the light fastness of the mixtures is in fact higher than that of the corresponding individual dyes. This is illustrated by way of example below in Table 7.

TABLE 7

| Dye No. | | LF [h] | |
|---|---|---|---|
| 3 | 25 | 28 | 22 |
| Mixture in weight ratio 1:1 | | 31 | |
| 4 | 25 | 27 | 22 |
| Mixture in weight ratio 1:1 | | 48 | |
| 7 | 24 | 11 | 18 |
| Mixture in weight ratio 1:1 | | 30 | |

We claim:

1. Dye mixtures including one or more pyridone dyes of the formula I

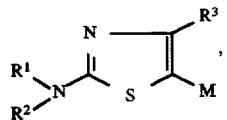

where $R^1$ and $R^2$ are independently of each other $C_1$–$C_{10}$-alkyl with or without substitution by $C_1$–$C_4$-alkoxycarbonyl, $C_1$–$C_4$-alkoxycarbonyloxy, whose alkyl chain may in each case be interrupted by an oxygen atom in ether function, or phenyl and with or without interruption by from 1 to 4 oxygen atoms in ether function, $C_5$–$C_7$-cycloalkyl, $C_3$–$C_4$-alkenyl, unsubstituted or $C_1$–$C_4$-alkyl-, $C_1$–$C_4$-alkoxy-, halogen- or or nitro-substituted phenyl, or $R^1$ and $R^2$ are together with the nitrogen atom joining them together a 5- or 6-membered saturated heterocyclic radical with or without further hetero atoms, $R^3$ is $C_3$–$C_{10}$-alkyl, unsubstituted or $C_1$–$C_4$-alkyl-, $C_1$–$C_4$-alkoxy-, halogen- or nitro-substituted phenyl or thienyl, $C_5$–$C_7$-cycloalkyl, and M is a radical of the formula

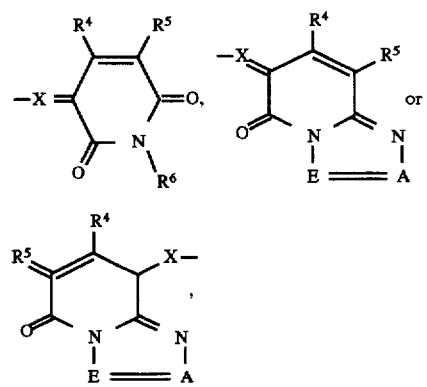

where

X is CH, $R^4$ is hydrogen, $C_1$–$C_6$-alkyl or unsubstituted or $C_1$–$C_4$-alkyl-, $C_1$–$C_4$-alkoxy-, halogen- or nitro-substituted phenyl, $R^5$ is cyano, carbamoyl, mono- or di($C_1$–$C_8$-alkyl) carbamoyl, carboxyl, $C_1$–$C_8$-alkoxycarbonyl or benzimidazolyl, $R^6$ is hydrogen, $C_1$–$C_{10}$-alkyl with or without substitution by phenyl, phenoxy, cyclohexyloxy or pyrazolyl and with or without interruption by from 1 to 4 oxygen atoms in ether function, $C_5$–$C_7$-cycloalkyl or unsubstituted or $C_1$–$C_4$-alkyl-, $C_1$–$C_4$-alkoxy-, halogen- or nitro-substituted phenyl, or a radical of the formula $NB^1B^2$ where $B^1$ and $B^2$ are independently of each other hydrogen, $C_1$–$C_{10}$-alkyl, unsubstituted or $C_1$–$C_4$-alkyl-, $C_1$–$C_4$-alkoxy-, halogen- or nitro-substituted phenyl, $C_1$–$C_9$-alkanoyl, $C_1$–$C_8$-alkylsulfonyl, unsubstituted or $C_1$–$C_4$-alkyl-, $C_1$–$C_4$-alkoxy-, halogen- or nitro-substituted phenylsulfonyl, pyridylsulfonyl, unsubstituted or $C_1$–$C_4$-alkyl-, $C_1$–$C_4$-alkoxy-, halogen- or nitro-substituted benzoyl, pyridylcarbonyl or thienylcarbonyl, and one of the two radicals A and E is nitrogen and the other is a radical of the formula C—$R^7$, where $R^7$ has the meaning of $C_{1-10}$-alkyl, with or without phenyl, phenoxy, cyclohexyloxy or pyrazolyl substitution and with or without interruption by from 1 to 4 oxygen atoms in ether function, of $C_5$–$C_7$-cycloalkyl or of unsubstituted or $C_1$–$C_4$-alkyl-, $C_1$–$C_4$-alkoxy-, halogen- or nitro-substituted phenyl, and one or more azo dyes of the formula II

D—N=N—K          (II), where

D is a radical of the formula

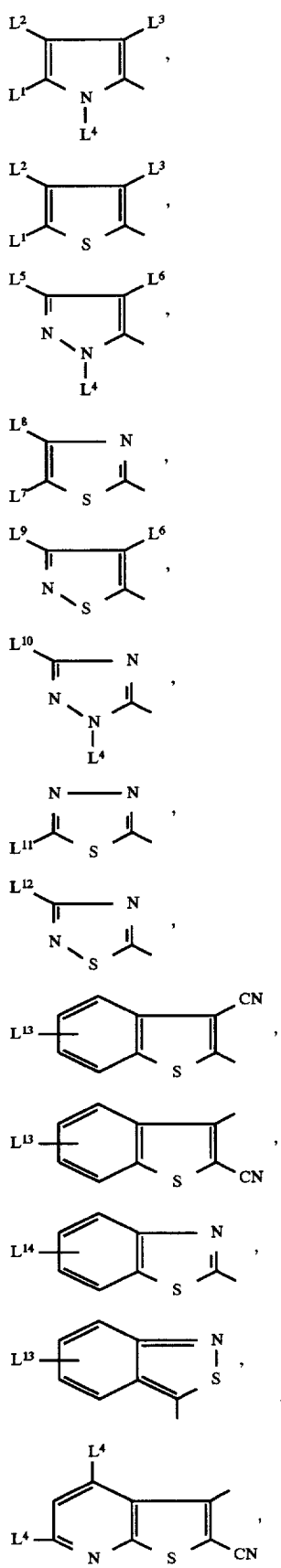

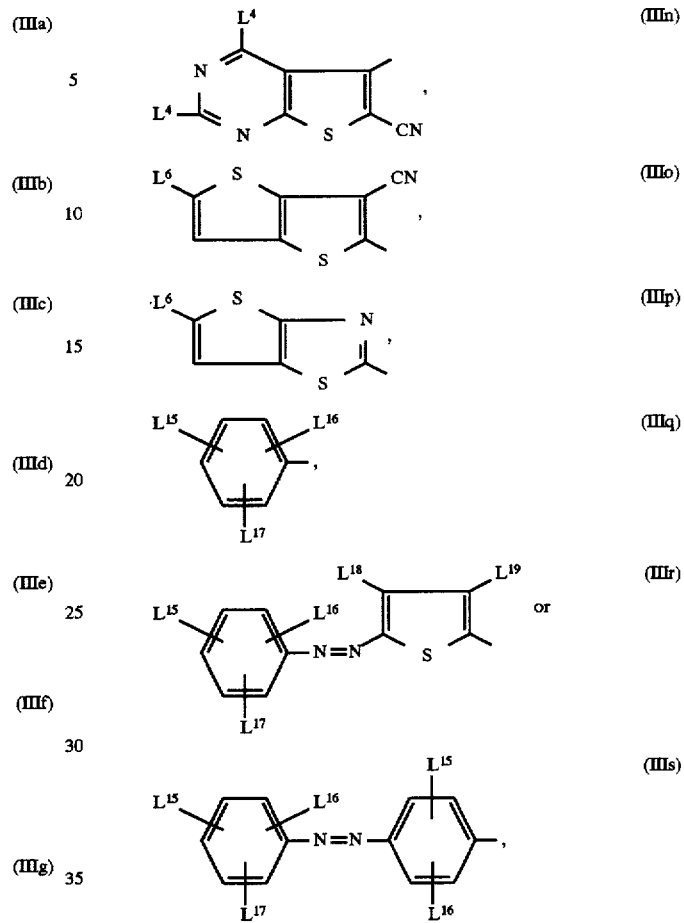

where

L¹ is nitro, cyano, $C_1$–$C_6$-alkanoyl, benzoyl, $C_1$–$C_8$-alkoxycarbonyl, $C_1$–$C_8$-alkylsulfonyl, unsubstituted or $C_1$–$C_4$-alkyl-, $C_1$–$C_4$-alkoxy-, halogen- or nitro-substituted phenylsulfonyl or a radical of the formula —CH=T, where T is hydroxyimino, $C_1$–$C_4$-alkoxyimino or a radical of an acidic-CH compound $H_2T$, L² is hydrogen, $C_1$–$C_6$-alkyl, unsubstituted or $C_1$–$C_4$-alkyl-, $C_1$–$C_4$-alkoxy-, halogen- or nitro-substituted phenyl, halogen, hydroxyl, mercapto, unsubstituted or phenyl- or $C_1$–$C_4$-alkoxy-substituted $C_1$–$C_6$-alkoxy, unsubstituted or $C_1$–$C_4$-alkyl-, $C_1$–$C_4$-alkoxy-, halogen- or nitro-substituted phenoxy, unsubstituted or phenyl-substituted $C_1$–$C_8$-alkylthio, unsubstituted or $C_1$–$C_4$-alkyl-, $C_1$–$C_4$-alkoxy-, halogen- or nitro-substituted phenylthio, $C_1$–$C_8$-alkylsulfonyl or unsubstituted or $C_1$–$C_4$-alkyl-, $C_1$–$C_4$-alkoxy-, halogen- or nitro-substituted phenylsulfonyl, L³ is cyano, $C_1$–$C_8$-alkoxycarbonyl or nitro, L⁴ is hydrogen, $C_1$–$C_6$-alkyl, phenyl or tolyl, L⁵ is $C_1$–$C_6$-alkyl, phenyl or tolyl, L⁶ is hydrogen, cyano, $C_1$–$C_8$-alkoxycarbonyl, $C_1$–$C_6$-alkanoyl, thiocyanato, halogen or nitro, L⁷ is nitro, cyano, $C_1$–$C_6$-alkanoyl, benzoyl, $C_1$–$C_8$-alkoxycarbonyl, $C_1$–$C_8$-alkylsulfonyl, unsubstituted or $C_1$–$C_4$-alkyl-, $C_1$–$C_4$-alkoxy-, halogen- or nitro-substituted phenylsulfonyl or a radical of the formula —CH=T, where T is as defined above, $L^8$ is hydrogen, $C_1$–$C_6$-alkyl, unsubstituted or $C_1$–$C_4$-alkyl-, $C_1$–$C_4$-alkoxy-, halogen- or nitro-substituted phenyl, cyano, halogen, unsubstituted or phenyl- or $C_1$–$C_4$-alkoxy-substituted $C_1$–$C_6$-alkoxy, unsubstituted or phenyl-substituted $C_1$–$C_8$-alkylthio, unsubstituted or $C_1$–$C_4$-alkyl-, $C_1$–$C_4$-alkoxy-, halogen- or nitro-substituted phenylthio, $C_1$–$C_8$-alkylsulfonyl, unsubstituted or $C_1$–$C_4$-alkyl-, $C_1$–$C_4$-alkoxy-, halogen- or nitro-substituted phenylsulfonyl or $C_1$–$C_8$-alkoxycarbonyl, $L^9$ is cyano, unsubstituted or phenyl-substituted $C_1$–$C_6$-alkyl, unsubstituted or phenyl-substituted $C_1$–$C_8$-alkoxy, unsubstituted or phenyl-substituted $C_1$–$C_8$-alkylthio, unsubstituted or $C_1$–$C_4$-alkyl-, $C_1$–$C_4$-alkoxy-, halogen- or nitro-substituted phenyl, thienyl, $C_1$–$C_4$-alkylthienyl, pyridyl or $C_1$–$C_4$-alkylpyridyl, $L^{10}$ is phenyl, tolyl or pyridyl, $L^{11}$ is trifluoromethyl, nitro, $C_1$–$C_6$-alkyl, phenyl, unsubstituted or phenyl-substituted $C_1$–$C_8$-alkylthio or $C_1$–$C_6$-dialkylamino, $L^{12}$ is $C_1$–$C_6$-alkyl, phenyl, unsubstituted or phenyl-substituted $C_1$–$C_8$-alkylthio, 2-cyanoethylthio or 2-($C_1$–$C_6$-alkoxycarbonyl)ethylthio, $L^{13}$ is hydrogen, nitro or halogen, $L^{14}$ is hydrogen, cyano, $C_1$–$C_8$-alkoxycarbonyl, nitro or halogen, $L^{15}$, $L^{16}$ and $L^{17}$ are independently of one another hydrogen, $C_1$–$C_6$-alkyl, $C_1$–$C_6$-alkoxy, halogen, nitro, cyano, unsubstituted or phenoxy-substituted $C_1$–$C_8$-alkoxycarbonyl, $C_1$–$C_8$-alkylsulfonyl or unsubstituted or $C_1$–$C_4$-alkyl-, $C_1$–$C_4$-alkoxy-, halogen- or nitro-substituted phenylsulfonyl, or $L^{15}$ and $L^{16}$ are together a radical of the formula CO—NW—CO, where W is $C_1$–$C_{10}$-alkyl with or without interruption by from 1 to 4 oxygen atoms in ether function and with or without substitution by hydroxyl, $L^{18}$ is hydrogen, methyl or chlorine, and $L^{19}$ is cyano or $C_1$–$C_8$-alkoxycarbonyl, and K is a radical of the formula

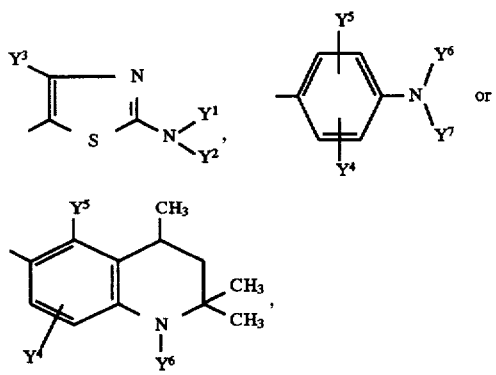

where $Y^1$ and $Y^2$ are independently of each other $C_1$–$C_{10}$-alkyl with or without substitution by cyano, hydroxyl, halogen, $C_1$–$C_4$-alkanoyloxy, $C_1$–$C_4$-alkoxycarbonyl, $C_1$–$C_4$-alkoxycarbonyloxy, whose alkyl chain may in each case be interrupted by an oxygen atom in ether function, or phenyl and with or without interruption by from 1 to 4 oxygen atoms in ether function, $C_5$–$C_7$-cycloalkyl, $C_3$–$C_4$-alkenyl, unsubstituted or $C_1$–$C_4$-alkyl-, $C_1$–$C_4$-alkoxy-, halogen- or nitro-substituted phenyl, or $Y^1$ and $Y^2$ are together with the nitrogen atom joining them together a 5- or 6-membered saturated heterocyclic radical with or without further hetero atoms, $Y^3$ is $C_3$–$C_{10}$-alkyl, $C_5$–$C_7$-cycloalkyl, unsubstituted or $C_1$–$C_4$-alkyl-, $C_1$–$C_4$-alkoxy-, halogen- or nitro-substituted phenyl or thienyl, $Y^4$ is hydrogen, $C_1$–$C_{10}$-alkyl with or without interruption by from 1 to 4 oxygen atoms in ether function, hydroxyl, $C_1$–$C_6$-alkoxy, $C_1$–$C_4$-alkylsulfonylamino, mono- or di($C_1$–$C_8$-alkyl)aminosulfonylamino or the radical —NHCOY$^8$ or —NHCO$_2$Y$^8$, where $Y^8$ is phenyl, benzyl, tolyl or $C_1$–$C_{10}$-alkyl with or without interruption by from 1 to 4 oxygen atoms in ether function, $Y^5$ is hydrogen, $C_1$–$C_6$-alkyl or $C_1$–$C_6$-alkoxy, and $Y^6$ and $Y^7$ are independently of each other hydrogen, $C_1$–$C_{10}$-alkyl, with or without substitution by cyano, hydroxyl, halogen, $C_1$–$C_4$-alkanoyloxy, $C_1$–$C_4$-alkoxycarbonyl, $C_1$–$C_4$-alkoxycarbonyloxy, whose alkyl chain may in each case be interrupted by an oxygen atom in ether function, or phenyl and with or without interruption by from 1 to 4 oxygen atoms in ether function, $C_5$–$C_7$-cycloalkyl, $C_3$–$C_4$-alkenyl, unsubstituted or $C_1$–$C_4$-alkyl-, $C_1$–$C_4$-alkoxy-, halogen- or nitro-substituted phenyl, or $Y^6$ and $Y^7$ are together with the nitrogen atom joining them together a 5- or 6-membered saturated heterocyclic radical with or without further hetero atoms.

2. Dye mixtures as claimed in claim 1, having a higher light fastness than the individual dyes (I) and (II).

3. Dye mixtures as claimed in claim 1 wherein $R^4$ is methyl.

4. Dye mixtures as claimed in claim 1 wherein $R^3$ is $C_3$–$C_{10}$-alkyl, phenyl or thienyl.

5. Dye mixtures as claimed in claim 1 wherein $R^6$ is $C_1$–$C_8$-alkyl, cyclopentyl, cyclohexyl or unsubstituted or $C_1$–$C_4$-alkyl- or $C_1$–$C_4$-alkoxy-substituted phenyl.

6. Dye mixtures as claimed in claim 1 wherein $R^7$ is $C_1$–$C_8$-alkyl or unsubstituted or $C_1$–$C_4$-alkyl- or $C_1$–$C_4$-alkoxy-substituted phenyl.

7. Dye mixtures as claimed in claim 1 wherein D is the radical of the formula IIIb, IIId, IIIe or IIIq.

8. Dye mixtures as claimed in claim 1 wherein D is a radical of the formula IIIb, IIId, IIIe or IIIq where $L^1$ is nitro, cyano, $C_1$–$C_4$-alkoxycarbonyl, formyl or a radical of the formula —CH=T, where T is as defined in claim 1, $L^2$ is hydrogen, $C_1$–$C_6$-alkyl or halogen, $L^3$ is cyano, $C_1$–$C_6$-alkoxycarbonyl or nitro, $L^6$ is cyano or nitro, $L^7$ is nitro, cyano, formyl, $C_1$–$C_6$-alkoxycarbonyl or a radical of the formula —CH=T, where T is as defined in claim 1, $L^8$ is $C_1$–$C_6$-alkyl, unsubstituted or $C_1$–$C_4$-alkyl-, $C_1$–$C_4$-alkoxy-, halogen- or nitro-substituted phenyl, cyano, halogen or $C_1$–$C_6$-alkoxycarbonyl, $L^9$ is unsubstituted or phenyl-substituted $C_1$–$C_6$-alkyl, unsubstituted or phenyl-substituted $C_1$–$C_6$-alkylthio, unsubstituted or $C_1$–$C_4$-alkyl-, $C_1$–$C_4$-alkoxy-, halogen- or nitro-substituted phenyl or thienyl, and $L^{15}$, $L^{16}$ and $L^{17}$ are independently of one another hydrogen, $C_1$–$C_6$-alkyl, $C_1$–$C_6$-alkoxy, nitro, cyano, unsubstituted or phenoxy-substituted $C_1$–$C_6$-alkoxycarbonyl, or $L^{15}$ and $L^{16}$ are together a radical of the formula CO—NW—CO, where W is as defined in claim 1.

9. Dye mixtures as claimed in claim 1 wherein $Y^1$, $Y^2$, $Y^6$ and $Y^7$ are independently of one another $C_1C_6$-alkyl with or without substitution by hydroxyl, $C_1$–$C_4$-alkanoyloxy, $C_1$–$C_4$-alkoxycarbonyl, $C_1$–$C_4$-alkoxycarbonyloxy or phenyl and with or without interruption by 1 or 2 oxygen atoms in ether function.

10. Dye mixtures as claimed in claim 1 wherein $Y^3$ is branched $C_3$–$C_{10}$-alkyl.

11. Dye mixtures as claimed in claim 1 wherein $Y^5$ is hydrogen, $C_1$–$C_4$-alkyl, methoxy, ethoxy or $C_1$–$C_6$-alkanoylamino.

12. A process for transferring dyes from a transfer to a plastic-coated paper by diffusion or sublimation with the aid of an energy source, which comprises using a transfer on which there is a dye mixture as claimed in claim 1.

* * * * *